United States Patent
Shibata et al.

(10) Patent No.: US 6,334,120 B1
(45) Date of Patent: Dec. 25, 2001

(54) SEMICONDUCTOR ARITHMETIC CIRCUIT AND DATA PROCESSING DEVICE

(75) Inventors: Tadashi Shibata, 3-16-411, Echujima 1-chome, Koto-ku, Tokyo 135-0044; Tadahiro Ohmi, 1-17-301 Komegabukuro 2-chome, Aoba-ku, Sendai-shi 980-0813; Tatsuo Morimoto, Miyagi-ken, all of (JP)

(73) Assignees: Tadashi Shibata, Tokyo; Tadahiro Ohmi, Miyagi-ken, both of (JP)

( * ) Notice: Subject to any disclaimer, the term of this patent is extended or adjusted under 35 U.S.C. 154(b) by 0 days.

(21) Appl. No.: 09/041,531

(22) Filed: Mar. 13, 1998

(30) Foreign Application Priority Data

Mar. 15, 1997 (JP) .................................................. 9-081877

(51) Int. Cl.$^7$ .......................... G06F 15/18; H03K 19/096; H03K 17/16
(52) U.S. Cl. .............................. 706/33; 326/98; 326/119; 327/389
(58) Field of Search ............................... 706/33; 326/98, 326/119; 327/389

(56) References Cited

U.S. PATENT DOCUMENTS

| | | | | |
|---|---|---|---|---|
| 5,258,657 | * | 11/1993 | Shibata et al. ......................... | 706/33 |
| 5,336,936 | * | 8/1994 | Allen et al. ............................ | 706/33 |
| 5,386,149 | * | 1/1995 | Arima .................................... | 706/33 |

(List continued on next page.)

FOREIGN PATENT DOCUMENTS

| | | |
|---|---|---|
| 60-68654 A | 4/1985 | (JP) . |
| WO 90/13912 | 11/1990 | (JP) . |
| 3-6679 A | 1/1991 | (JP) . |
| WO 92/16971 | 10/1992 | (JP) . |
| 5-335506 A | 12/1993 | (JP) . |
| 5-335656 A | 12/1993 | (JP) . |
| WO 93/24958 | 12/1993 | (JP) . |
| 6-53431 A | 2/1994 | (JP) . |
| 6-77427 A | 3/1994 | (JP) . |

(List continued on next page.)

OTHER PUBLICATIONS

Yamashita et al, "Neuron MOS Winner–Take All Circuit and its Application to Associative Memory", IEEE International Solid–State Conference, 1993.*

Shibata et al, "Neuron Transister: A Neuron–Like High–Functionality Transfer Implementng Intelligence on Silicon", IEEE Workshop on VLSI Signal Processing, Sep. 1995.*

(List continued on next page.)

Primary Examiner—George B. Davis
(74) Attorney, Agent, or Firm—Randall J. Knuth

(57) ABSTRACT

A semiconductor device capable of executing size comparison operations on a plurality of data at high speed and in real time and using simple circuitry. An inverter circuit group is used containing a plurality of inverter circuits constructed using neuron MOS transistors. Predetermined signal voltages are applied from the exterior to the first input gates of the inverter circuits, and the output signals of all inverters contained in the inverter circuit group are inputted into a first logical arithmetic circuit and a second logical arithmetic circuit, and the output signal of the first logical arithmetic circuit is inputted into a third logical arithmetic circuit controlled by the output signal of the second logical arithmetic circuit, and the output of the third logical arithmetic circuit is fed back to the second input gates of the inverter circuits contained in the inverter circuit group. Bye use of the output signals of the inverter circuit groups, the position having the maximum voltage among the signal voltages inputted into the inverter circuit groups is specified.

14 Claims, 25 Drawing Sheets

U.S. PATENT DOCUMENTS

| | | | | |
|---|---|---|---|---|
| 5,521,858 | * | 5/1996 | Shibata et al. | 365/185.03 |
| 5,539,329 | * | 7/1996 | Shibata et al. | 326/39 |
| 5,587,668 | * | 12/1996 | Shibata et al. | 326/36 |
| 5,594,372 | * | 1/1997 | Shibata et al. | 326/12 |
| 5,621,336 | * | 4/1997 | Shibata et al. | 706/33 |
| 5,661,421 | * | 8/1997 | Ohmi et al. | 706/33 |
| 5,706,403 | * | 1/1998 | Shibata et al. | 706/33 |
| 5,784,018 | * | 7/1998 | Ohmi et al. | 341/136 |
| 5,818,081 | * | 8/1998 | Ohmi et al. | 706/33 |
| 5,822,497 | * | 10/1998 | Ohmi et al. | 706/33 |
| 5,917,742 | * | 6/1999 | Ohmi et al. | 708/801 |
| 5,923,205 | * | 7/1999 | Shibata et al. | 327/361 |
| 5,937,399 | * | 8/1999 | Ohmi et al. | 706/33 |
| 5,959,484 | * | 9/1999 | Ohmi et al. | 327/200 |

FOREIGN PATENT DOCUMENTS

| | | |
|---|---|---|
| 6-112427 A | 4/1994 | (JP) . |
| 6-139380 A | 5/1994 | (JP) . |
| 6-244375 A | 9/1994 | (JP) . |
| 6-250994 A | 9/1994 | (JP) . |
| 6-252744 A | 9/1994 | (JP) . |
| 07153924 A | 6/1995 | (JP) . |
| 07161942 A | 6/1995 | (JP) . |
| WO 95/20268 | 7/1995 | (JP) . |
| 07200513 A | 8/1995 | (JP) . |
| 07211084 A | 8/1995 | (JP) . |
| 07226085 A | 8/1995 | (JP) . |
| 07226912 A | 8/1995 | (JP) . |
| WO 95/22145 | 8/1995 | (JP) . |
| 08084062 A | 3/1996 | (JP) . |
| 08195091 A | 7/1996 | (JP) . |
| 08221504 A | 8/1996 | (JP) . |
| 08274197 A | 10/1996 | (JP) . |
| WO 96/30853 | 10/1996 | (JP) . |
| WO 96/30855 | 10/1996 | (JP) . |
| 09244875 A | 9/1997 | (JP) . |
| 09245110 A | 9/1997 | (JP) . |
| WO 96/30854 | 10/1996 | (WO) . |
| WO 96/30948 | 10/1996 | (WO) . |

OTHER PUBLICATIONS

Yamashita et al, "Write/Verify Free Analog Non–Volatile Memory Using a Neuron–MOS Comparator", International Symposium on Circuits and Systems, May 1996.*

Shibata et al, "A Functional MOS Transistor Featuring Gate–Level Weighted Sum and Threshold Operations" IEEE Transactions on Electron Devices, Jun. 1992.*

* cited by examiner

CONTROLLER CIRCUIT DIAGRAM          CHIP IMAGE

SURFACE AREA : 510 × 520 μm²
Technology :
 Rule     0.8 μm
 Process  C−MOS
  2 Layer Poly 2 Layer Metal

CIRCUIT PRODUCED

Chip Specifications:
  Surface area    2060 × 2950 μm²
  Pin                    64 Pin
  Power supply    5V
Technology:
  Rule                  0.8 μm
  Process             C – MOS
    2 layer poly 2 layer metal

TEST CIRCUITS PRODUCED

BINARY CIRCUIT

SURFACE AREA : 83 × 31 $\mu m^2$

NEURON MOS CIRCUIT

SURFACE AREA : 36 × 29 $\mu m^2$

Technology :
  Rule    0.8 $\mu m$
  Process C – MOS
2 LAYER POLY 2 LAYER METAL

SEMICONDUCTOR ARITHMETIC CIRCUIT AND DATA PROCESSING DEVICE

BACKGROUND OF THE INVENTION

1. Field of the Invention

The present invention relates to a semiconductor arithmetic circuit and data processing device, and more particularly relates to a highly functional semiconductor integrated circuit and data processing device capable of executing size comparisons of a plurality of inputted data at high speed in a time-continuous manner using hardware.

2. Description of the Related Art

In the fields of data processing and automatic control, the comparison of data expressed in numerical values and determinations as to the relative size thereof serve an extremely important function.

For example, examples thereof include the selection of the larger of two numbers, the extraction of data having a maximum value among a plurality of inputted data, and so-called sorting, in which a plurality of data are arranged by size of the numerical values thereof.

Such operations are normally conducted by using calculators; however, because a large number of operations are required, time is required and the use thereof in real-time control is extremely difficult. In particular, in the case of use in the control of robots and the like, calculations must be carried out by equipment attached to the robots, so that realization using small LSI chips is desired.

However, when attempts are made to conduct such processing via the programming of microprocessors, an extremely large amount of time is required, and practical application is essentially impossible. For this reason, research and development has been conducted into the production of a circuit which is capable of directly conducting size comparisons using hardware; however, a large number of elements are required in order to realize such a circuit, and operations must be conducted through a number of stages, so that small-scale LSI which is capable of high speed operations has not been realized.

SUMMARY OF THE INVENTION

The present invention provides a semiconductor device which is capable of conducting size comparison operations with respect to a plurality of real time data at high speed, using simple circuitry.

The semiconductor arithmetic circuit comprises a semiconductor arithmetic circuit which is constructed using one or more neuron MOS transistors provided with a semiconductor region of one conductivity type on a substrate, source and drain regions of an opposite conductivity type provided within this region, and a floating gate electrode which is provided at a region separating the source and drain regions via an insulating film in an electrically floating state. A plurality of input gate electrodes which are capacitively coupled with the floating gate electrode via insulating films is also included. An inverter circuit group comprising a plurality of inverter circuits constructed using neuron MOS transistors is provided, and an externally supplied predetermined signal voltage is applied to at least one first input gate of the input circuits, and the output signals of all of the inverters contained in the inverter circuit group, or output signals obtained by passing these output signals through a predetermined number of stages of inverter circuits, are inputted into a first logical arithmetic circuit and a second logical arithmetic circuit, and the output signal of the first logical arithmetic circuit, or an output signal obtained by passing this through a predetermined number of stages of inverter circuits, is inputted into a third logical arithmetic circuit which is controlled by the output signal of the second logical arithmetic circuit, and the output of the third logical arithmetic circuit is fed back to the second input gates of the inverter circuits contained in the inverter circuit group, and as a result of the output signals of the inverter circuit group, the position having a maximum voltage among the signal voltages inputted into the inverter circuit group is specified.

The first logical arithmetic circuit has the function of outputting a predetermined logical signal to the output terminal thereof when the number of values of '1' or '0' among the plurality of binary signal inputs exceeds the predetermined number.

Furthermore, the first logical arithmetic circuit contains an inverter circuit constructed using one or more neuron MOS transistors.

The first logical arithmetic circuit outputs a value of '0' when the number of values of '1' among the plurality of binary signal inputs is one or more.

The second logical arithmetic circuit alters its output signal in accordance with predetermined rules when the number of values of '1' or '0' among the plurality of binary inputs exceeds a predetermined number. Furthermore, the second logical arithmetic circuit has the function of specifying the number of values '1' among the plurality of binary signal inputs, and alters the output signal thereof in accordance with predetermined rules in accordance with the number of values of '1'.

The third logical arithmetic circuit attenuates or amplifies, by a predetermined proportion, an inputted signal by means of at least one control signal, and outputs this signal. Alternatively, a predetermined signal voltage, or the input signal, may be used as the output signal. Alternatively, the third logical circuit may have two or more outputs, and the outputs of the third logical arithmetic circuit may be inputted into an identical number of second input gates.

The data processing device of the present invention is provided with semiconductor arithmetic circuits, a plurality of which are connected in stages, and which are provided with a mechanism for accepting a plurality of numerical values from the exterior, and storing these, and in which the plurality of numerical values are inputted into a semiconductor arithmetic circuit, the output signal of the semiconductor arithmetic circuit is inputted into a fourth logical arithmetic circuit, and by means of the output signal of the fourth logical arithmetic circuit, at least one numerical value is selected from the plurality of numerical values and outputted.

The semiconductor circuits which are connected in a plurality of stages individually select and execute optimal processing in accordance with the plurality of numerical values applied thereto.

Furthermore, a fifth logical arithmetic circuit is provided which receives predetermined signals from both the sending side semiconductor system and the receiving side semiconductor system of the numerical value selected, and when these signals meet prespecified conditions, outputs predetermined signals to both sides.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

| Description of the References | |
|---|---|
| 101–104 | input gates, |
| 105 | switching block, |
| 106 | logical circuit, |
| 201–205 | P-channel neuron MOS transistors, |
| 206–210 | N-channel neuron MOS transistors, |
| 211–216 | inverter circuits, |
| 217–220 | MOS cells A, |
| 221 | MOS cell B, |
| 301 | silicon substrate, |
| 302, 303 | source and drain, |
| 304 | gate insulating film, |
| 305 | channel region, |
| 306 | floating gate electrode, |
| 307 | insulating film, |
| 308a, 308b, 308c, 308d | input gate electrodes, |
| 401 | floating gate, |
| 402, 403 | MOS, |
| 404, 405, 406 | input gates, |
| 407 | standard inverter circuit, |
| 408 | variable threshold inverter circuit, |
| 601 | floating gate, |
| 602, 603 | MOS, |
| 604–608 | input gates, |
| 609, 610 | standard inverter circuit, |
| 1101 | output terminal of the winner-take-all circuit, |
| 1102 | OR circuit, |
| 1103 | counter, |
| 1104 | more-than-two circuit, |
| 1105 | AND circuit, |
| 1106 | clock generator, |
| 1201 | ALL OR, |
| 1202 | T flip flop, |
| 1203 | more-than-two circuit, |
| 1204 | T flip flop, |
| 1205 | XOR, |
| 1206 | AND, |
| 1701 | analog multiplier, |
| 1702 | logical circuit, |
| 1801, 1802 | winner-take-all cells which send data, |
| 1803, 1804 | C circuits which take the timing at the time of the sending and reception of data, |
| 1901 | winner-take-all cell, |
| 1902 | SRAM for storing data, |
| 1903, 1904 | registers for sending and reception of winner and loser data, |
| 1905 | controller, |
| 1906 | digital control neuron MOS winner-take-all circuit, |
| 2001 | SRAM of the input portion, |
| 2002, 2003, 2004, 2005 | neuron MOS inverter cells, |
| 2006 | switching block, |
| 2007 | winner-take-all controller, |
| 2008 | MOS controller, |
| 2009, 2010, 2011, 2012, 2013 | gain controllers, |
| 2014 | feedback controller, |
| 2301 | ALL OR, |
| 2302 | more-than-two circuit, |
| 2303 | decrimenter circuit, |
| 2304 | watch dog circuit. |

DETAILED DESCRIPTION OF PREFERRED EMBODIMENTS OF THE INVENTION

Hereinbelow, the present invention will be explained in detail using embodiments; however, it is of course the case that the present invention is in no way restricted to the embodiments described.

Embodiment 1

Figure 1:
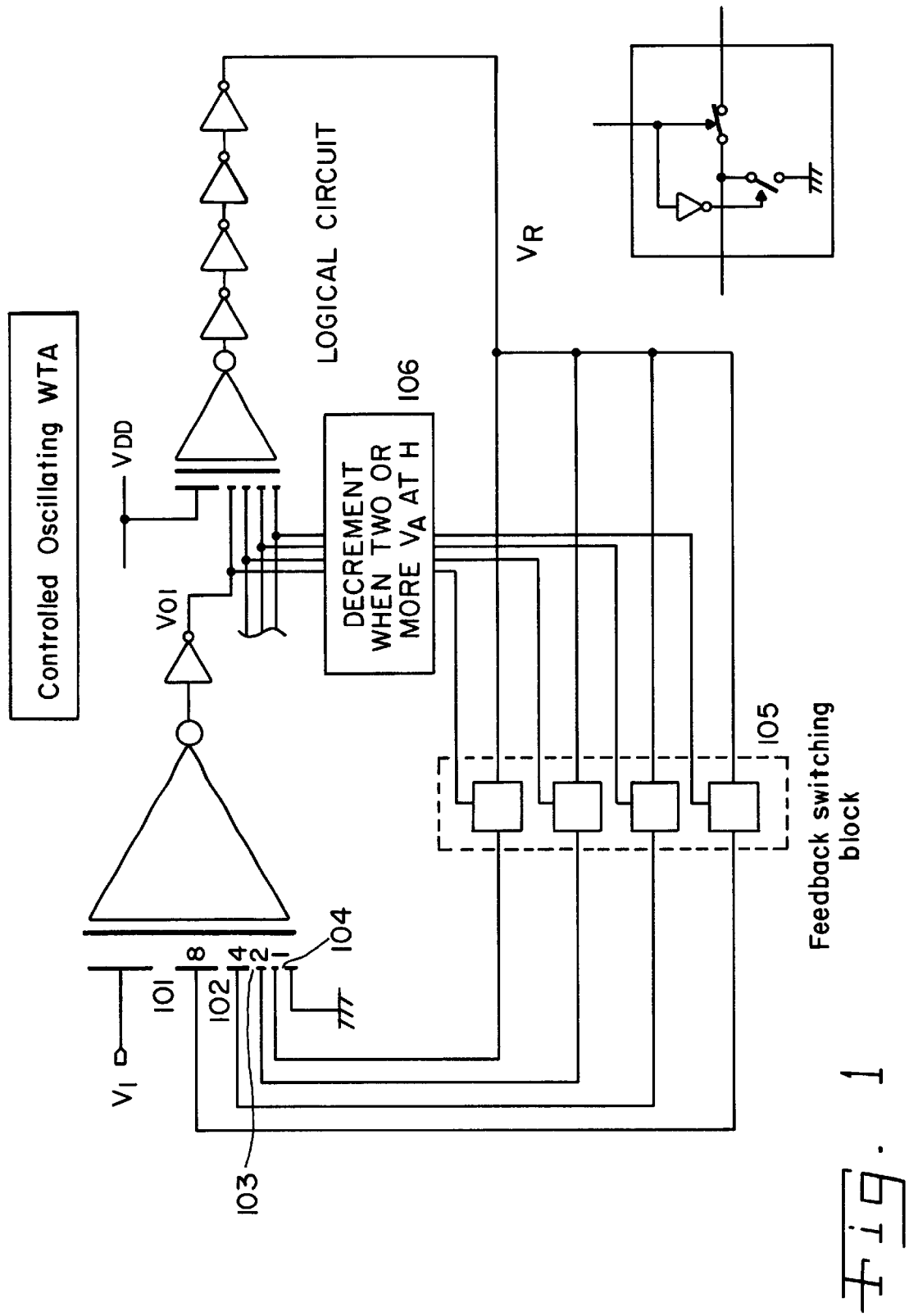
FIG. 1 is a circuit diagram showing an example of a winner-take-all circuit of the present invention.

A first embodiment of the present invention will be explained using the circuit diagram of FIG. 1. In the circuit of FIG. 1, outputs $V_{O1}$, $V_{O2}$, $V_{O3}$, and $V_{O4}$, respectively, correspond to four input signals $V_1$, $V_2$, $V_3$, and $V_4$, and only the output corresponding to the maximum input has a value of '1', while the other outputs all have values of '0'. Only the winner has a value of '1', while the others all have values of '0', so that this is a type of circuit termed a winner-take-all circuit. This circuit serves an important function in various types of image processing, such as neural networks. In this FIG. 1, only the portion corresponding to $V_1$ and $V_{O1}$ is depicted; however, in the same manner, pre-stage portion circuits corresponding to $V_2$, and $V_{O2}$, $V_3$ and $V_{O3}$, and $V_4$ and $V_{O4}$, are present, and the feedback portions are all connected in the same manner. In this embodiment, for the purposes of the explanation, the number of inputs was limited to 4; however, it is of course the case that any number of inputs may be employed.

In order to explain the operation of the circuit of FIG. 1, first the operation of a time-continuous follow-type winner-take-all circuit such as that depicted in FIG. 2 will be explained.

Figure 2:
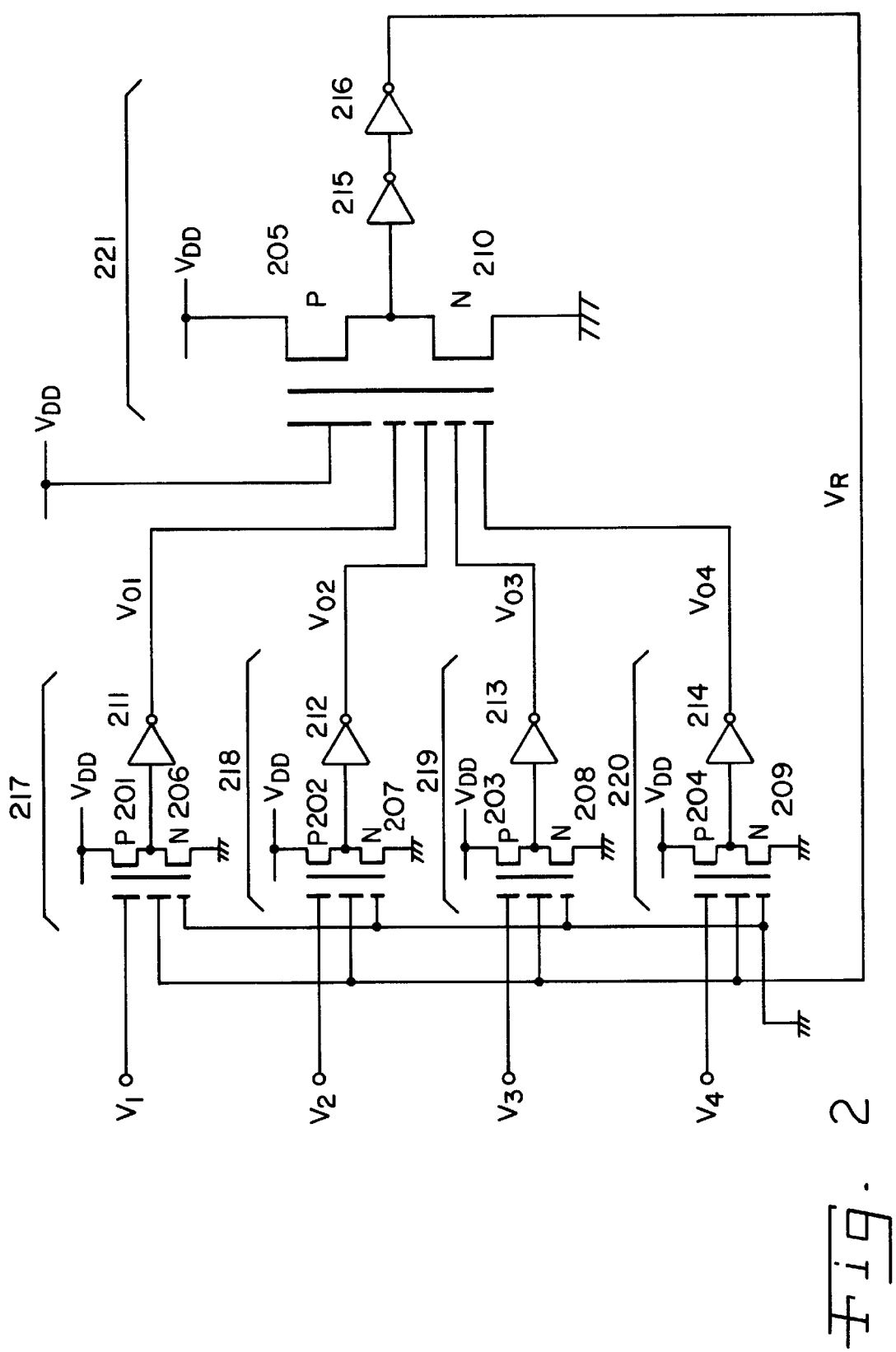
FIG. 2 is a circuit diagram showing a time-continuous follower-type winner-take-all circuit.

In FIG. 2, references 201–205 indicate P-channel neuron MOS transistors, while references 206–210 indicate N-channel neuron MOS transistors. The neuron MOS transistor is a transistor having a function similar to that of the neurons which are the cells comprising the brain; these are MOS transistors of a completely novel conception which were invented in order to realize neuron computers (inventors: Tadashi Shibata, Tadahiro Ohmi, Japanese Patent Application, First Publication, No. HEI 3-6679). Hereinbelow, these transistors will be termed MOS.

These MOS are transistors having extremely powerful functions; it is an important feature of the present invention that these MOS are employed as basic elements. The structure and function of the MOS will be explained using FIGS. 3(a) and 3(b). The P-channel MOS (shortened to P-MOS) and the N-channel MOS (shortened to N-MOS) are connected to a drain, and these form a CMOS type inverter circuit employing neuron MOS. This is termed a complimentary MOS inverter, or is shortened to a C-MOS inverter.

References 211–216 indicate standard inverter circuits.

Figure 3A:
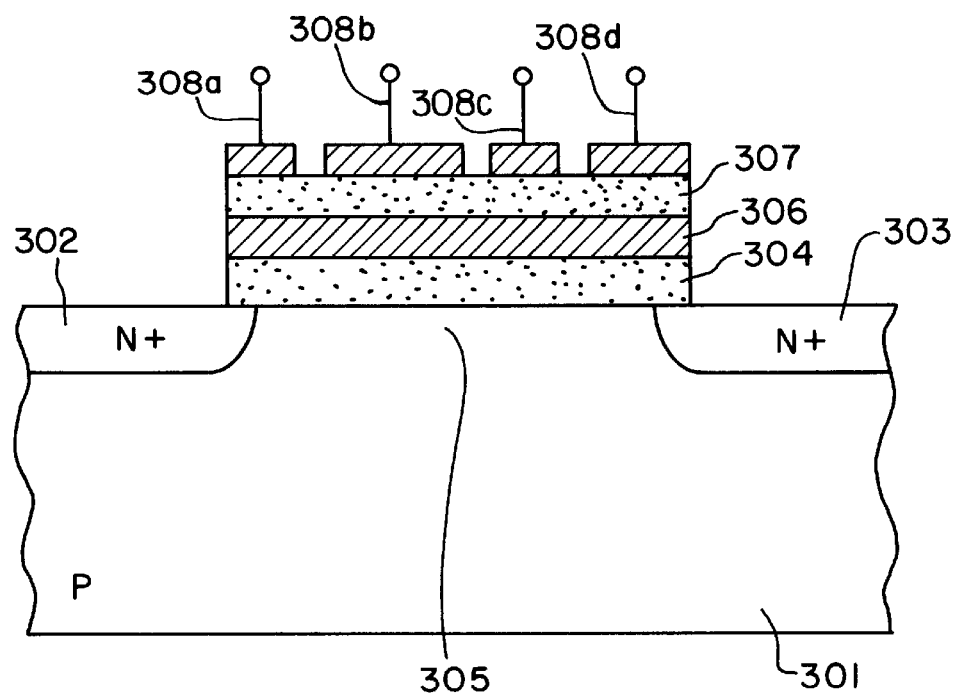
FIGS. 3(a) and 3(b) show the cross-sectional structure and a schematic diagram of a four-input N-channel MOS transistor (N-MOS)
Figure 3B:
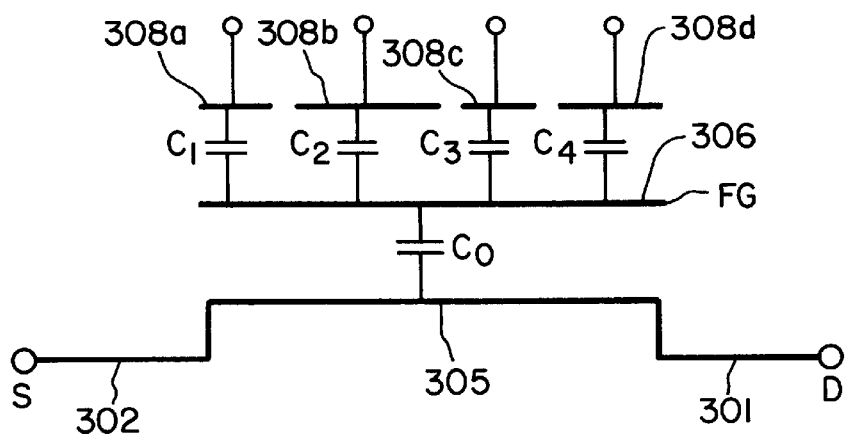

In order to explain the operation of the circuitry of FIG. 2, first the structure and operational principle of the MOS will be explained. FIG. 3(a) shows an example of the cross-sectional structure of a four-input N-channel MOS transistor (N-MOS); herein, reference 301 indicates a silicon substrate of, for example, the P type, references 302 and 303 indicate a source and a drain formed by a $N^+$ diffusion layers, reference 304 indicates a gate insulating film (for example, $SiO_2$ film) which is provided on a channel region 305 between the source and the drain, reference 306 indicates a floating gate electrode which is electrically insulated and in a potentially floating state, reference 307 indicates an insulating film comprising, for example, $SiO_2$, and references 308a, 308b, 308c, and 308d indicate gate electrodes. FIG. 3(b) is a diagram showing a further simplification thereof in order to analyze the MOS operation. As shown in the figure, the capacitive coupling coefficients between each input gate electrode and the floating gate are represented by $C_1$, $C_2$, $C_3$, and $C_4$, and the coupling capacity between the floating gate and the silicon substrate is represented by $C_0$, so that the potential $_F$ of the floating gate is given by the following formula:

$$_F=(C_1V_1+C_2V_2+C_3V_3+C_4V_4)/C_{TOT}$$

Here, $C_{TOT}=C_0+C_1+C_2+C_3+C_4$. $V_1$, $V_2$, $V_3$, and $V_4$ indicate voltages applied to, respectively, input gates 308a, 308b, 308c, and 308d, and the potential of the silicon substrate is 0V, so that it is grounded.

The potential of source 302 is set to 0V. That is to say, the potential of all the electrodes are set to values measured using the source as a standard. Proceeding in this manner, the MOS shown in FIG. 3(a) is identical to an N-channel MOS transistor if the floating gate is viewed as a standard gate electrode, and when the gate potential $_F$ thereof exceeds a threshold value ($V^*_{TH}$), then an electron channel (N channel) is formed in the region 305 between source 302 and drain 303, and the source and drain are electrically connected. That is to say, the MOS enters a conductive state (ON) when the following conditions are met:

$$_F=(C_1V_1+C_2V_2+C_3V_3+C_4V_4)/C_{TOT}>V_{TH}$$

The above explanation dealt with the case of an N-channel MOS transistor; however, devices also exist in which the source 302, drain 303, and substrate 301 in FIG. 3(a) are all of the opposite conductivity type. That is to say, the substrate is of the N type, while the source and drain are formed by $P^+$ diffusion layers, and such an MOS is termed a P-channel MOS transistor (P-MOS).

Figure 4:
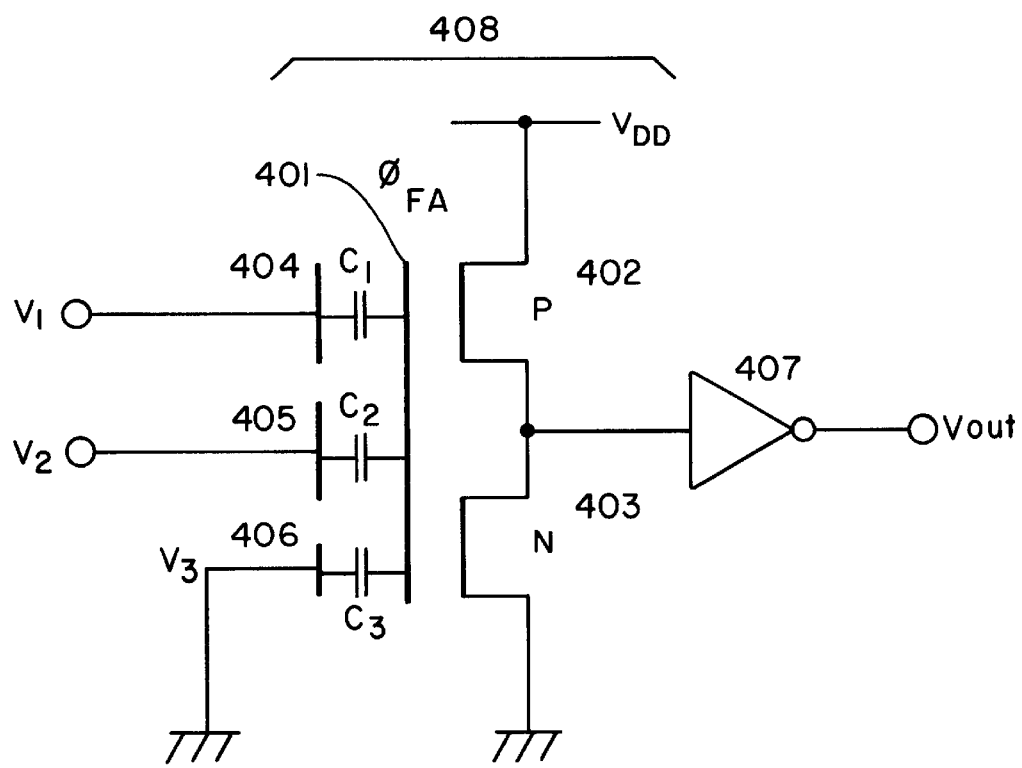
FIG. 4 is a schematic diagram showing the prestage portion 217 of the circuit of FIG. 2.

FIG. 4 shows the circuit of FIG. 2 with the pre-stage portion 217 removed in order to explain the operation of the circuit.

In FIG. 4, reference 401 indicates a floating gate, and this gate is common to two MOS (402 and 403). References 404, 405, and 406 indicate input gates, and the capacitive coupling coefficients between these gates and the floating gate are represented by $C_1$, $C_2$, and $C_3$.

Three signal voltages $V_1$, $V_2$, and $V_3$ are inputted into this circuit, and $V_1$ and $V_2$ are signal voltages which are freely variable over time. $V_3$ is a signal voltage which serves to regulate the operation of the circuit, and this is commonly grounded. Reference 407 indicates a standard inverter circuit. The circuit 408 is, when viewed from $V_1$, a variable threshold inverter circuit, the threshold of which varies with $V_2$. The circuit of FIG. 4 is termed a MOS cell A.

Figure 5:
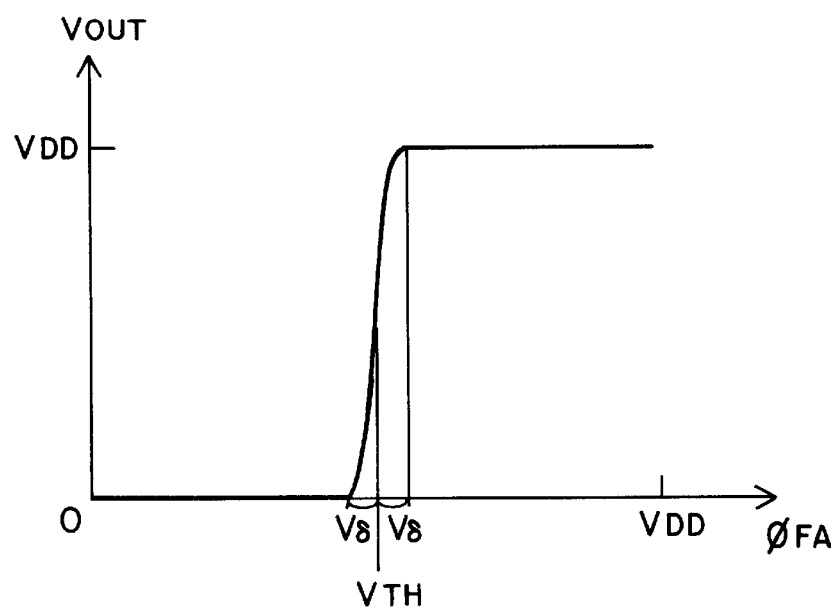
FIG. 5 is a graph showing the relationship between $V_{OUT}$ and the floating gate potential $,_{FA}$.

The capacitive coupling ratios with respect to the inputs are set in the following manner. That is to say, if the capacitive coupling ratio in the MOS cell A is set in the following manner:

$$C_1/C_3=C_2/C_3=(V_{TH}-V)/V_{DD}-2(V_{TH}-V))$$

then the relationship between $V_{OUT}$ and $_{FA}$ (the potential of floating gate 401) is as shown in FIG. 5.

The operation of the MOS cell A having this design will now be explained.

If the potential of floating gate 401 is represented by $_{FA}$ then $$_{FA}=(C_1V_1+C_2V_2+C_3V_3)/C_{TOT}$$

and when $_{FA}$ becomes larger than the inversion voltage $V^*_1$ of the inverter as seen from the floating gate, that is to say, when the following conditions are met:

$$(C_1V_1+C_2V_2+C_3V_3)/C_{TOT}>V_{TH}$$

then inverter 408 enters an ON state and the output thereof is inverted. In order to simplify the explanation, the following condition is set:

$$C_0<<C_1+C_2+C_3$$

and it is assumed that $C_0$ can be ignored. That is to say, it is assumed that $$C_{TOT}=C_1+C_2+C_3$$

It is of course the case that the following explanation will be unchanged even if $C_0$ has a value approximately equivalent to that of $C_1+C_2+C_3$.

In the circuit of FIG. 4, the inversion threshold of the inverter as seen from the floating gate is set to $V_{TH}=V_{DD}/2$ and the design is such that $C_1=C_2$. Furthermore, $V_3=0V$. It is of course the case that these values may be substituted with other values where necessary.

Under the above conditions, the conditions under which C-MOS inverter 408 enters an ON state are as follows:

$$((V_{TH}-V)/V_{DD})\cdot(V_1+V_2)>V_{TH}$$

If $V_{TH}=V_{DD}/2$ is inserted into the above formula and the formula is rewritten, then since the setting is such that $V<<V_{DD}$, the following results:

$$V_1+V_2>V_{DD}/(1-2V/V_{DD})V_{DD}(1+2V/V_{DD})>V_{DD}$$

That is to say, when $V_1+V_2$ becomes larger than $V_{DD}+2V$, the inverter of FIG. 4 inverts. However, when $V_1+V_2=V_{DD}$, the inverter does not invert.

Figure 6:
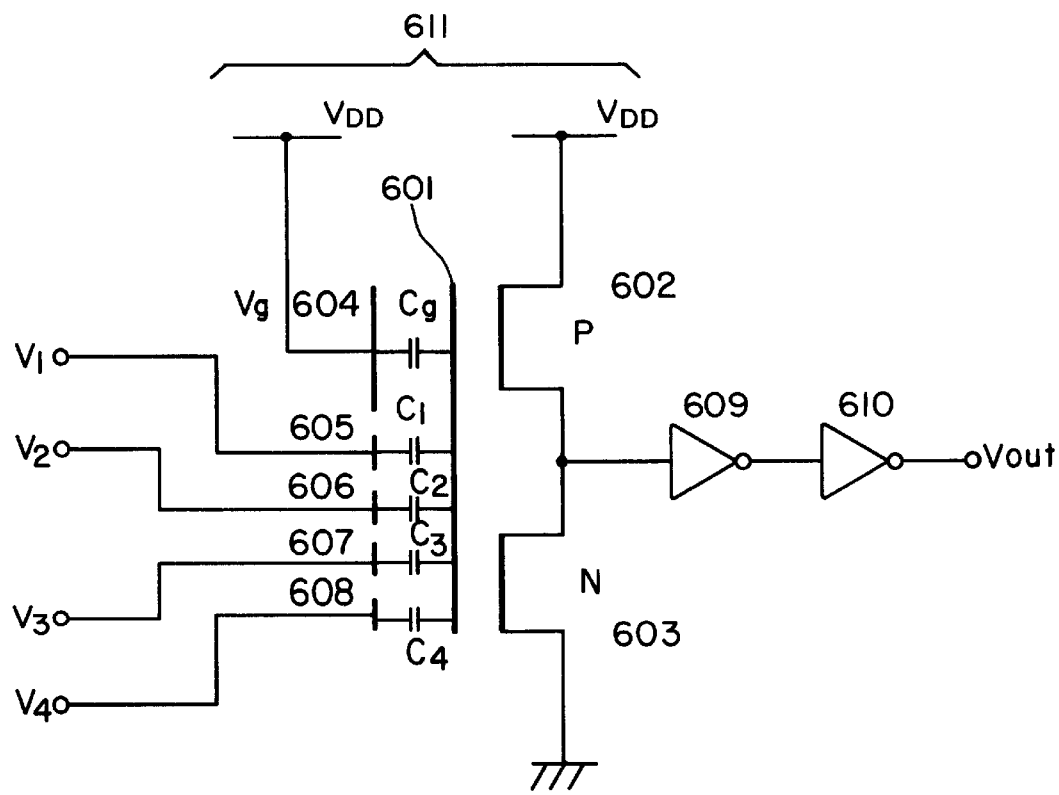
FIG. 6 is a schematic diagram showing the latter stage portion 221 of the circuit of FIG. 2.

The circuit of FIG. 6 shows the circuit of FIG. 2 with the latter stage portion 221 removed in order to explain the operation thereof.

Reference 601 indicates a floating gate; this gate is common to the two MOS (602 and 603). References 604–608 indicate input gates; the capacitive coupling coefficients between these input gates and the floating gate are represented by $C_g$, $C_1$, $C_2$, $C_3$, and $C_4$.

The five signal voltages $V_g$, $V_1$, $V_2$, $V_3$, and $V_4$ are inputted into this circuit; $V_1$, $V_2$, $V_3$, and $V_4$ are signal voltages which may be freely altered over time, and are the input voltages from the MOS cell A described above. $V_g$ is a signal voltage which serves to regulate the operation of the circuit; it is normally set to the power source voltage $V_{DD}$. References 609 and 610 indicate standard inverter circuits. These circuits make a determination as to whether at least one value of '1' is present in the input, or if more than one such value is present. The circuitry shown in FIG. 6 is termed the MOS cell B.

The capacitive coupling ratios of the inputs are determined as shown below. That is to say, $C_1=C_2=C_3=C_4$, and the following results:

$$C_g/C_1=(1/2)\cdot(2nV_{TH}-V_{DD})/(V_{DD}-V_{TH})$$

Here, n represents the number of inputs, and in this case, n=4. If $V_{TH}=V_{DD}/2$, then the following results:

$$C_g/C_1=n-1$$

In general, the following results:

$$C_g/(C_1+C_2+\ldots+C_n)=(n-1)/n$$

The operation of the MOS cell B designed in this manner will now be explained.

If the potential of floating gate 601 is represented by then the following results:

$$_{FB}=C_gV_g+C_1V_1+C_2V_2+C_3V_3+C_4V_4)/C_{TOT}$$

and when $_{FB}$ exceeds the threshold voltage $V*_1$ of the inverter as seen from the floating gate, that is to say, when the following conditions are met:

$$(C_gV_g+C_1V_1+C_2V_2+C_3V_3+C_4V_4)/C_{TOT}>V_{TH}$$

then the C-MOS inverter 611 enters an ON state, and the output thereof is inverted. Here, in order to simplify the explanation, the following condition was set:

$$C_0<<C_g+C_1+C_2+C_3+C_4$$

so that is assumed that $C_0$ can be ignored. That is to say, it is assumed that:

$$C_{TOT}=C_g+C_1+C_2+C_3+C_4$$

It is of course the case that the explanation given below will not change even if $C_0$ has a value roughly equivalent to $C_g+C_1+C_2+C_3+C_4$.

In the circuit of FIG. 6, the design is such that $C_1=C_2=C_3=C_4$. Furthermore, $V_g$ is normally equal to $V_{DD}$. It is of course the case that these values may be replaced with other values where necessary.

Under the above conditions, the conditions under which C-MOS inverter 611 enters an ON state are as follows:

$$3V_{DD}+V_1+V_2+V_3+V_4)/7>V_{DD}/2$$

As is clear from this formula, the above inequality is not satisfied when $V_1=V_2=V_3=V_4=0$, and the inverter does not invert. However, when any of $V_1$, $V_2$, $V_3$, and $V_4$, or more than one of these, reaches a value of $V_{DD}$, then the above formula is satisfied, and C-MOS inverter 611 inverts.

Figure 7:
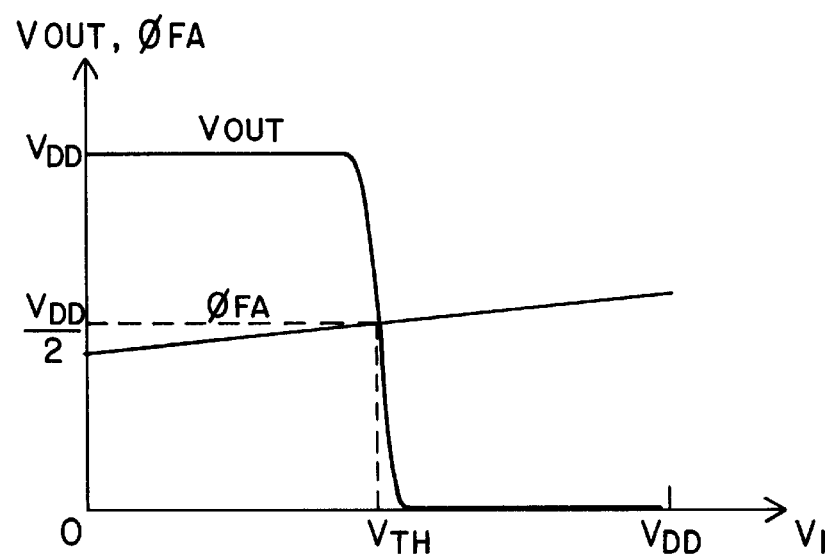
FIG. 7 is a graph showing the relationship between $V_1$ of the MOS cell B, the floating gate potential $_{FB}$ and the output $V_{OUT}$.

In FIG. 7, $V_1$ of the MOS cell B which was designed using these values is plotted along the horizontal axis, while the floating gate potential $_{FB}$ and the output $V_{OUT}$ are plotted along the vertical axis. The case is shown in which $V_2$ and $V_3$ have fallen to the ground potential. By means of $V_1$, the potential of the floating gate cuts across the threshold voltage $V_{DD}/2$, and the output of MOS inverter 611 is inverted.

As shown in FIG. 2, when the output of MOS cell B 221 is fed back to each MOS cell A (217–220), this forms a ring oscillator comprising an odd number of inverter stages.

Next, the operation principle of the circuit as a whole will be explained.

Figure 8:
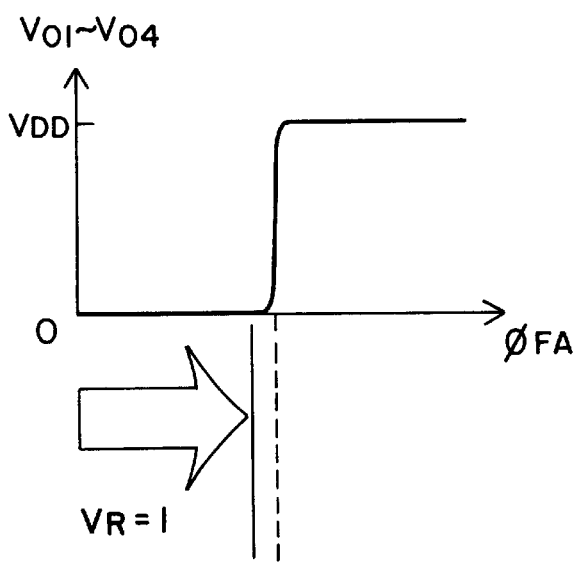
FIGS. 8, 9 and 10 are graphs explaining the circuit operation of FIG. 2.

First, when the inputs all have a value of 0, the output of all MOS cells A has a value '0', so that the output MOS cell B has a value '1'. This output is fed back to the MOS cells A; however, since the inputs all have a value of 0, MOS cells A continuously output a value of '0', as shown in FIG. 8, and are thus stable.

Figure 9:
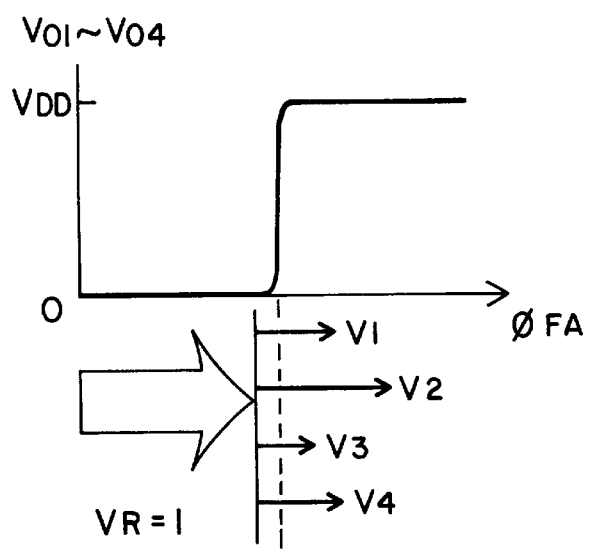

Next, a signal voltage is applied to the input terminals of the MOS cells A. For example, if 3.5V is applied to cell 217, 4.5V is applied to cell 218, 2.0V is applied to cell 219, and 3.0V is applied to cell 220, then $_{FA}$ is increased by the amount of the input voltage, as shown in FIG. 9, so that MOS cells A (217–220) all invert and output a value of '1'. MOS cell B 221 reacts to this and begins to reduce $V_R$ to a value of 0. When $V_R$ declines, the output of MOS cell A 219, which has the smallest inputted voltage, first falls to a value of '0'. Next, the output of the MOS cell A 220, which has the next smallest input voltage, falls to a value of '0', and then the output of MOS cell A 217 falls to a value of 0 however, MOS cell B 221 maintains its inverted state if even one value of '1' is inputted among $V_1-V_4$, so that until the output of the final MOS cell 218 changes from 1 to 0, $V_R$ continues to decrease. When the output of the final MOS cell A 218 finally reaches a value of '0', then the state of MOS cell B 221 is inverted, and now $V_R$ begins to increase in the direction of a value of '1'. When this occurs, the output of the MOS cell A 218, which has the largest input voltage, changes to a value '1', and MOS cell B 221 again experiences an inversion of the state thereof, and now $V_R$ begins to decrease in the direction of a value of '0'.

Figure 10:
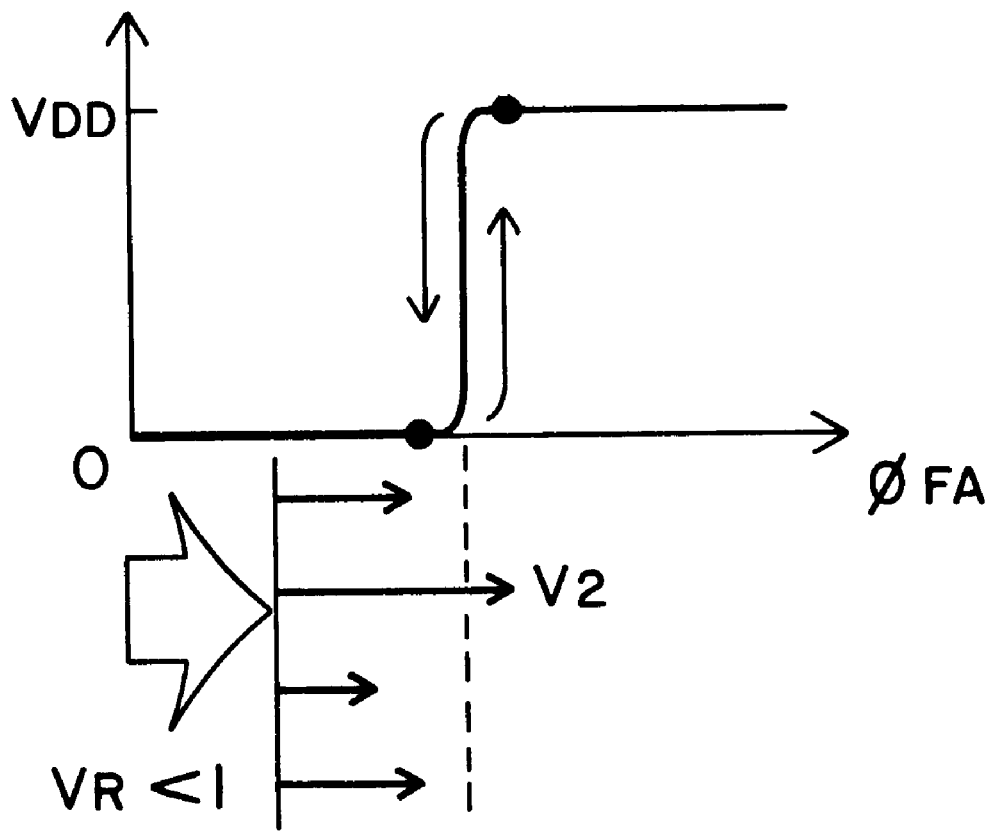

In this way, $V_R$ is made to oscillate in the vicinity of the threshold value of the MOS cell A 218 having the largest input, so that the oscillation loop of this circuit is formed so as to always include the MOS cell A 218 having the largest input (FIG. 10). In this way, it is possible to specify the position of the input voltage having the largest value in a time-continuous manner.

Next, an explanation will be made of the circuitry of FIG. 1 in accordance with the present invention.

Based on the oscillation type neuron MOS winner-take-all circuit described, the following points were improved.

(1) The coupling capacity of the MOS inverters of each input stage with respect to the floating gate was divided, and the coupling ratio thereof was set so that, with respect to 101, 102, 103, and 104, the ratio was 1:2:4:8.

(2) A switching block (105) was appended which divided the feedback voltage $V_R$ and selected whether to set the capacity of the neuron MOS inverter cells A with respect to the floating gate to $V_R$ or to reduce this to the ground potential.

(3) In order to control the switching block (105), a logical circuit (106) having the output of the winner-take-all circuit as the input thereof was appended.

As a result of the division of the coupling capacity of (1) and the switch of (2), it is possible to freely alter the feedback gain of the feedback voltage $V_R$.

Figure 11:
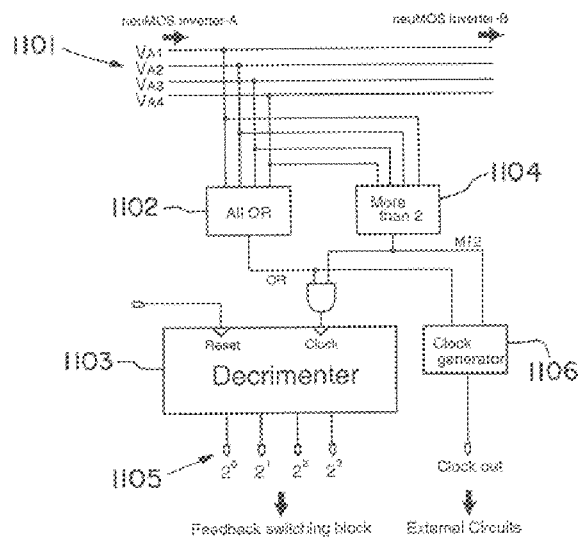
FIG. 11 is a block diagram and a chip image of logical circuit 106.
Figure 11:
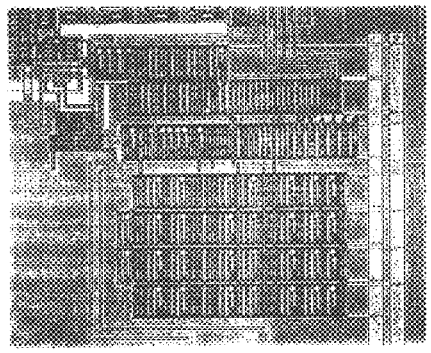

FIG. 11 shows a block diagram and a chip image of the logical circuit of portion 106. The upper four lines 1101 are the output terminals of a winner-take-all circuit, and this logical circuit has the signals of these output terminals as inputs thereof. The inputs from these output terminals oscillate when the winner-take-all circuit is in operation, and all the OR of the inputs (1102) is connected to the clock terminal of a counter (decrimenter) (1103). The circuit specifies a winner, and when only one input terminal is oscillating, a more-than-two circuit (1104) detects this, and the clock signal to the counter is masked by means of an AND circuit (1105). The output of the counter (decrimenter) (1103) is connected to the switching block (105) which serves to switch the feedback gain. Furthermore, a clock generator (1106) is also provided in order to generate a signal indicating to the exterior that a winner has been specified.

Figure 12:
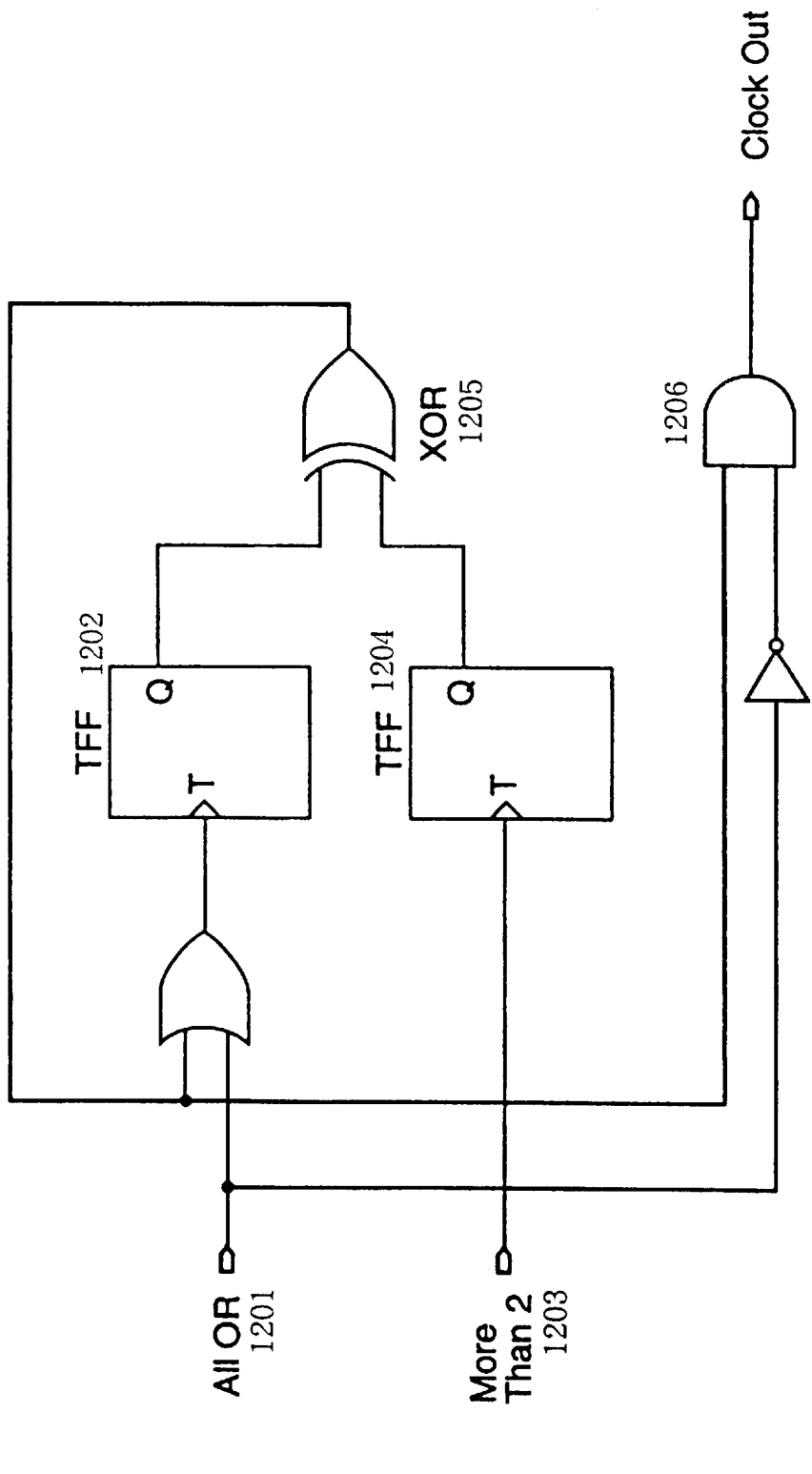
FIG. 12 is a circuit diagram of a clock generator.

FIG. 12 shows a circuit diagram of the clock generator (1106). This circuit generates a signal indicating that a winner has been specified.

When the winner-take-all circuit specifies a winner, the output signal passes through the clock generator, and the clock generator outputs an oscillating waveform. This oscillating waveform is employed as a clock which drives a circuit which processes the data after a winner has been specified.

This circuit fundamentally comprises a T flip flop and an XOR. When only one circuit is oscillating, only the ALL OR (1201) oscillates, so that the T flip flop (1202) experiences an inversion of the state thereof at the rising edge of the ALL OR (1201). On the other hand, the T flip flop (1204) at the more-than-two (1203) side does not experience a state inversion, and the output of the XOR (1205) reaches a value of 1 (High). The output of the XOR (1205) is entered into the ALL OR side T flip flop (1202) and this is latched. For this reason, the output AND (1206) oscillates together with the ALL OR in such a form that the output reaches a value of 1 (High) at the down edge of the ALL OR. In the state in which two or more are oscillating, the T flip flop (1204) on the more-than-two side experiences a state inversion, so that the when the state is agreement with that of the T flip flop (1202) on the ALL OR side, the output of the XOR (1205) falls to a level of 0 (Low).

For this reason, the output of the ALL OR is masked by the output AND (1206), and an oscillating waveform is not outputted, and the output remains at a level of 0.

Figure 13:
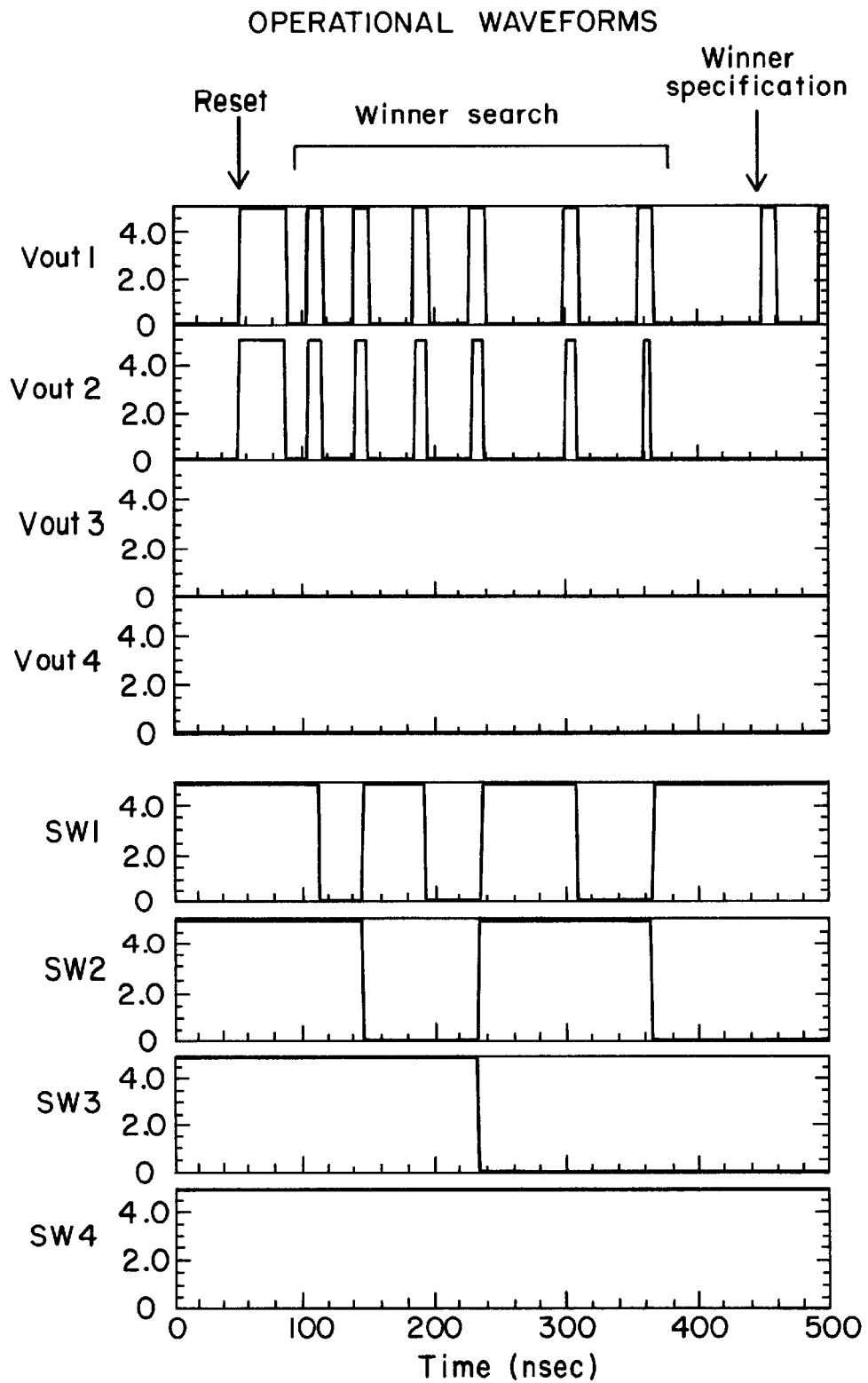
FIG. 13 is a graph showing the waveforms of the output of the circuit of FIG. 1 and the output of logical circuit 106.

In order to test the operation of this digital control neuron MOS winner-take-all circuit, a simulation was conducted using HSPICE, and the results thereof are shown in FIG. 13. The upper four waveforms are the outputs of the circuit. The bottom four are the outputs of the logical circuit and are signals which control the ON and OFF states of switching blocks connected to coupling capacities ordered by size. First, the circuit is reset, and a winner is sought. If there are two or more levels of 1 (High) in the output nodes, the logical circuit reduces the coupling capacity by levels one by one. When only one output node is oscillating, the logical circuit ceases operations, and specifies the winner at this point.

Figure 14:
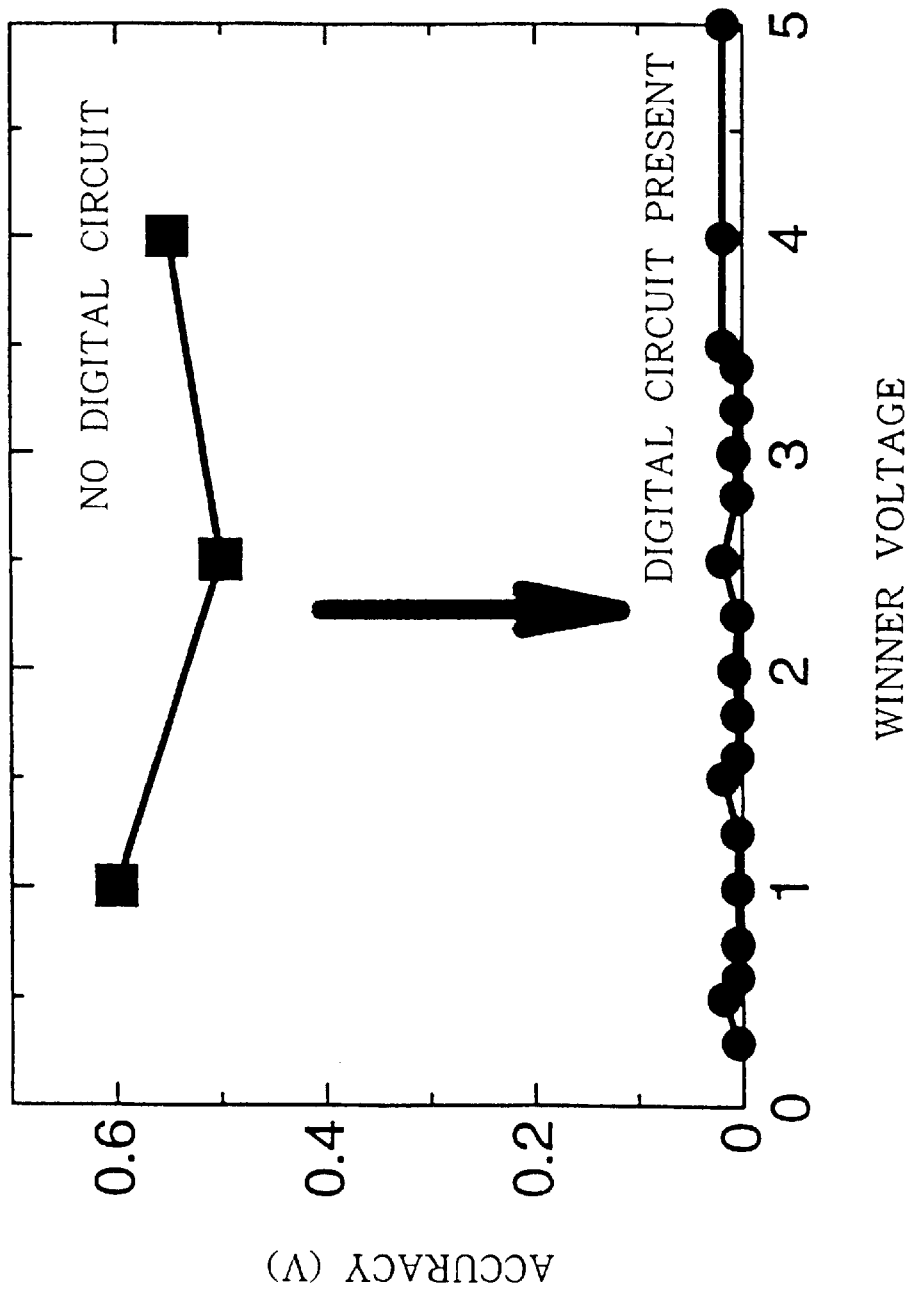
FIG. 14 is a graph on which is plotted the winner bracketing accuracy of a digital control, neuron MOS winner-take-all circuit.

FIG. 14 shows a plot of the winner bracketing accuracy of the digital control neuron MOS winner-take-all circuit.

The horizontal axis indicates the winner voltage, while the vertical axis indicates the winner bracketing accuracy. This graph shows the winner bracketing accuracy of the circuit in the case in which there is no logical circuit. The bottom graph shows the winner bracketing accuracy of the circuit when the logical circuit is operating.

In this way, it was confirmed that the accuracy of this circuit is improved when a logical circuit is added thereto.

Figure 15:
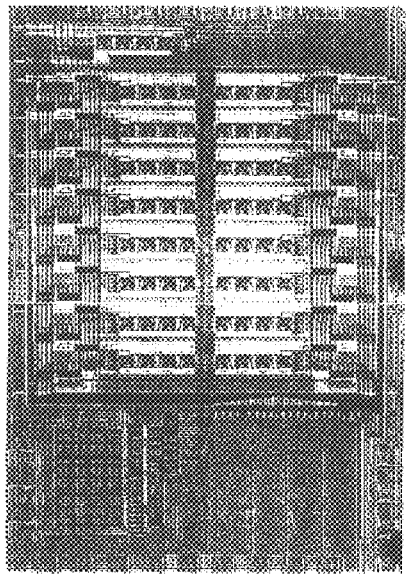
FIG. 15 is a chip image of the semiconductor integrated circuit of the embodiment produced.

In order to test the operation of this digital control neuron MOS winner-take-all circuit, it was actually constructed as a semiconductor integrated circuit. A chip image thereof is shown in FIG. 15. The circuit of the image is a 16 input digital control neuron MOS winner-take-all circuit. This is constructed using C-MOS.

The surface area of the chip was 2050×2950 square microns, and employed a two-layer poly two-layer metal process using a 0.8 micron rule.

Figure 16:
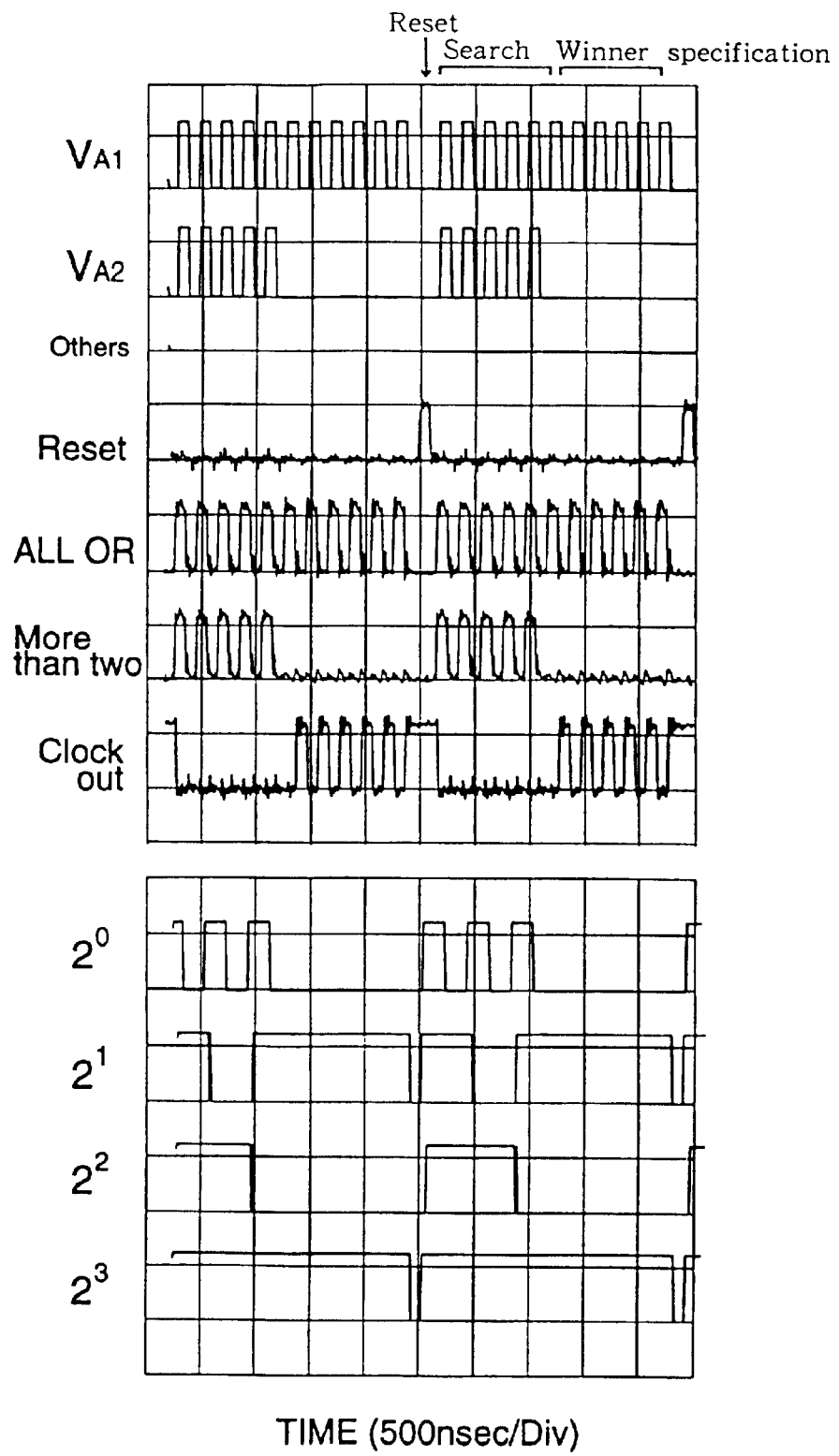
FIG. 16 is a graph showing the measured waveform of the semiconductor integrated circuit of FIG. 15.

FIG. 16 shows the measured waveforms of the chip depicted in FIG. 15. The waveforms indicate, from the top, the winner output, the second winner output, the other output, the reset signal, the ALL OR, the more-than-two, the clock out, and the $2^0$ output, the $2^1$ output, $2^2$ output, and the $2^3$ output, of the decrimenter.

Because a comparison of all the numbers was conducted in methods employing conventional software, the operation slowed considerably as the number of data increased; however, by means of the present invention, a maximum value search can be conducted at high speed and with high accuracy.

(Embodiment 2)

A second embodiment of the present invention will be explained using the circuit diagram of FIG. 17.

Figure 17:
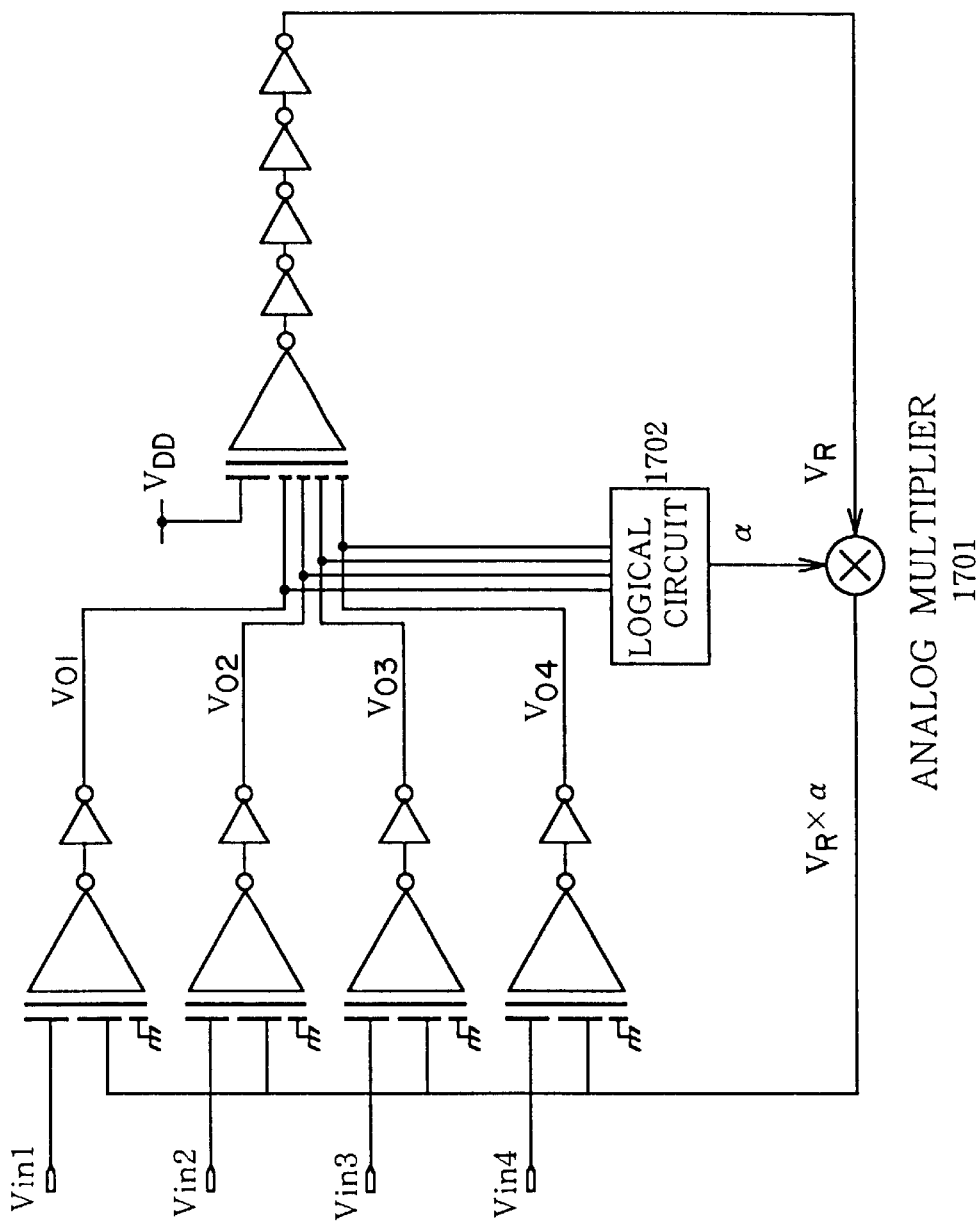
FIG. 17 is a circuit diagram showing a second embodiment of the present invention.

In the same manner as in Embodiment 1, in the circuit of FIG. 17, outputs $V_{O1}$, $V_{O2}$, $V_{O3}$, and $V_{O4}$ correspond, respectively, to four input signals $V_1$, $V_2$, $V_3$, and $V_4$, and only that output corresponding to the maximum input has a value of '1' while the other outputs all have a value of '0'. In this embodiment, for the purposes of the explanation, the number of inputs was limited to four; however, it is of course the case that any number of inputs may be employed.

The difference between this circuit and the circuit of FIG. 1 is that the switching block (105) is replaced with an analog multiplier (1701). This multiplier, in response to a control signal from a logical circuit (1702), reduces the voltage $V_R$ inputted into the analog multiplier from the neuron MOS inverter cell B, and outputs $V_R X$, and this is fed back to neuron MOS inverter cells A.

In the same manner as in the circuit of FIG. 1, logical circuit (1702) reduces the control voltage so that the control voltage becomes progressively smaller when there are two or more oscillations, and continues to be reduced until the position of the winner is specified, and the position of the winner may then finally be specified.

(Embodiment 3)

A third embodiment of the present invention will be explained using the circuit diagram of FIG. 18.

Figure 18:
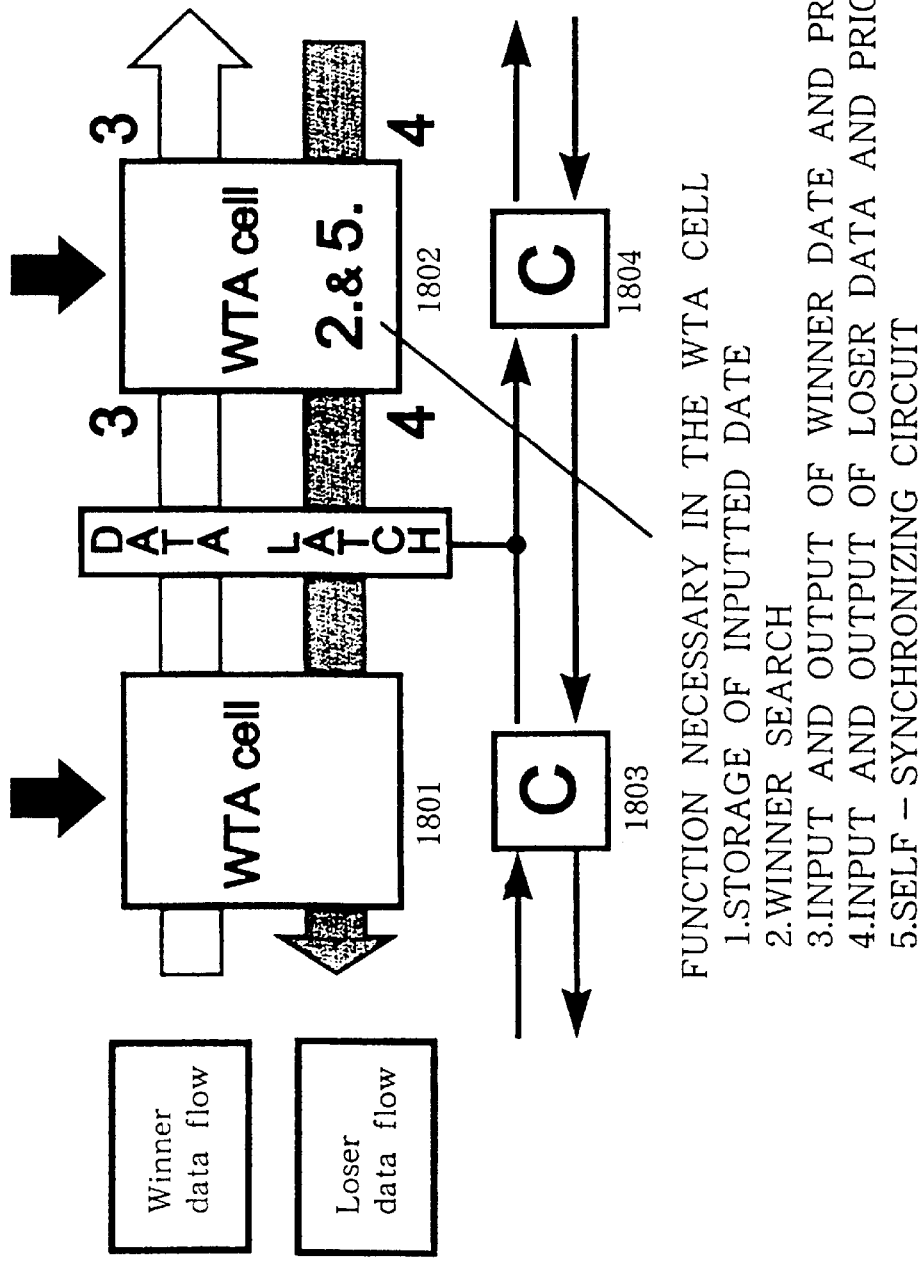
FIG. 18 is a circuit diagram showing a third embodiment of the present invention.

A plurality of data are inputted into the circuit of FIG. 18, and the circuit outputs the data having the highest priority appended thereto, so that this circuit is a type of circuit known as a priority queue circuit.

In the present embodiment, a priority queue circuit is realized using data flow architecture.

This circuit comprises winner-take-all cells (1801, 1802), which find the winner and transmit the data, and C circuits (1803, 1804), which take the timing during the sending and reception of data and will be later described.

For example, in order to construct a priority queue having 513 inputs, 33 16-input winner-take-all cells are prepared, and arranged in a series, and by the exchange of data between these circuits and the neighboring circuits, it is possible to find the data having the highest priority among the whole. It is of course the case that any number of winner-take-all cells may be employed in correspondence with the number of inputs.

Figure 19:
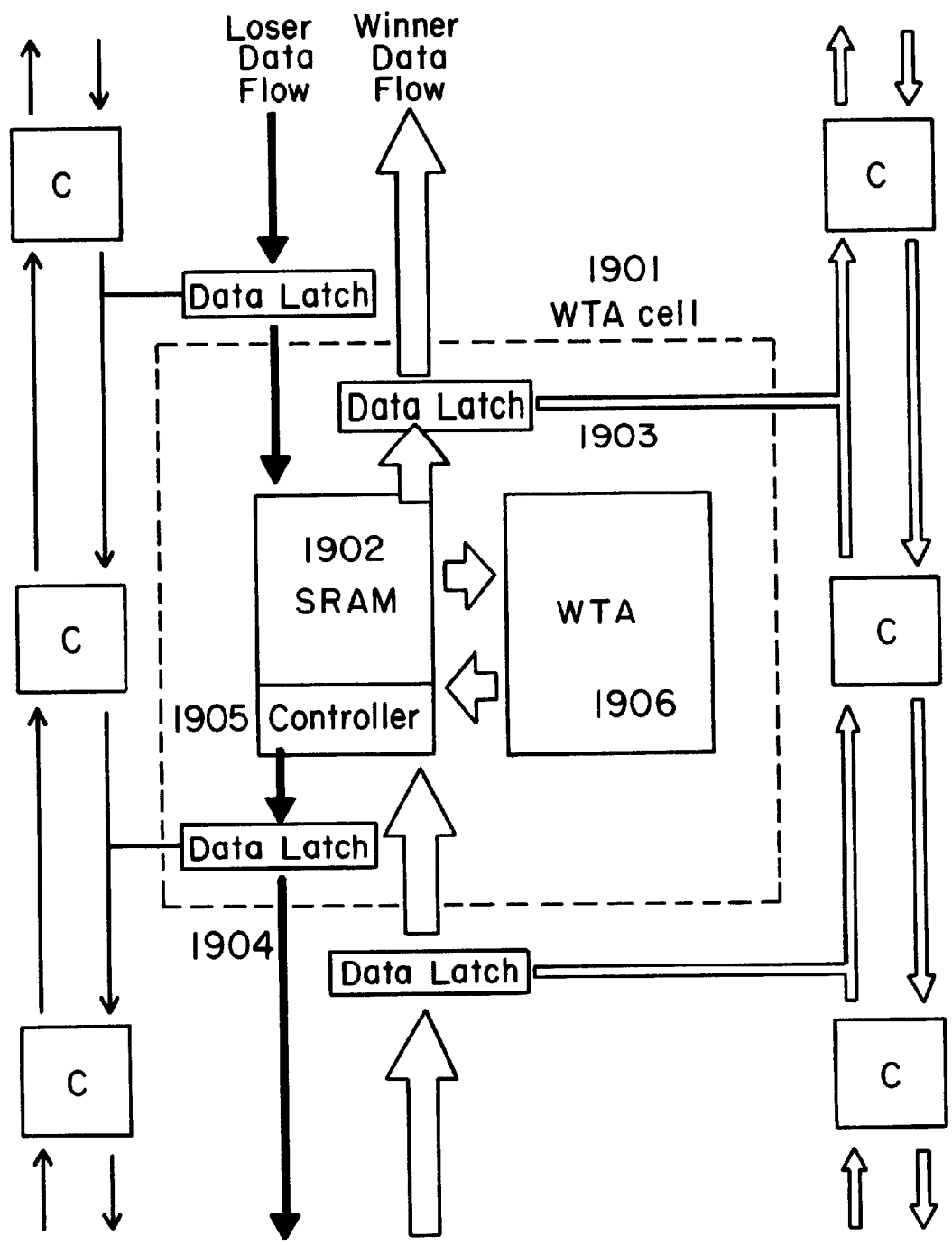
FIG. 19 is a block diagram of the interior of a winner-take-all cell.

FIG. 19 is a block diagram of the internal parts of a winner-take-all cell, which serves to explain the operation of the circuit. The portion within the dotted line comprises the winner-take-all cell (1901).

This winner-take-all cell (1901) takes the following seven states.

Storing the inputted data and the priority inputs.

Finding the winner.

Sending the winner data (a group containing the input data having the largest priority, and the priority thereof) in a stipulated direction.

Sending the loser data in a stipulated direction.

Receiving winner data from a stipulated direction.

Receiving loser data from a stipulated direction.

Standby state.

In order to construct this winner-take-all cell (1901), an SRAM (1902) serving to store data, registers (1903, 1904) for the sending and reception of winner and loser data, and a controller (1905) controlling the entire circuit, were added to the digital control neuron MOS winner-take-all circuit (1906) described above.

Figure 20:
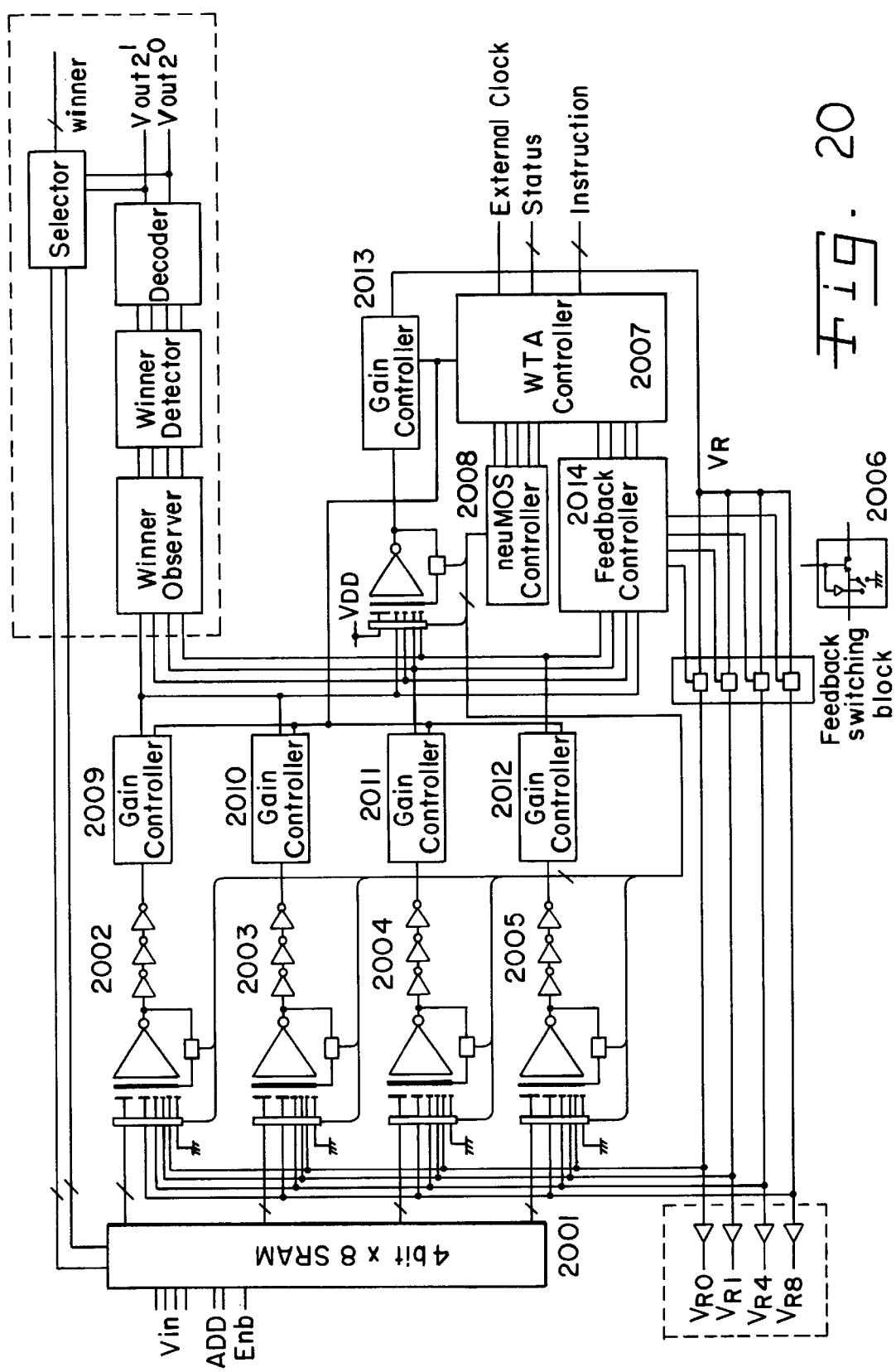
FIG. 20 is a block diagram showing the details of the winner-take-all portion.

FIG. 20 is a block diagram showing the details of the winner-take-all portion of the circuit. This circuit assumes a four-bit priority and four inputs; however, it is of course the case that the priority may consist of any number of bits, and any number of inputs may be employed.

First, the data and priorities are inputted into the input portion SRAM 2001. These priorities are inputted into neuron MOS inverter cells A (2002, 2003, 2004, 2005).

Figure 21:
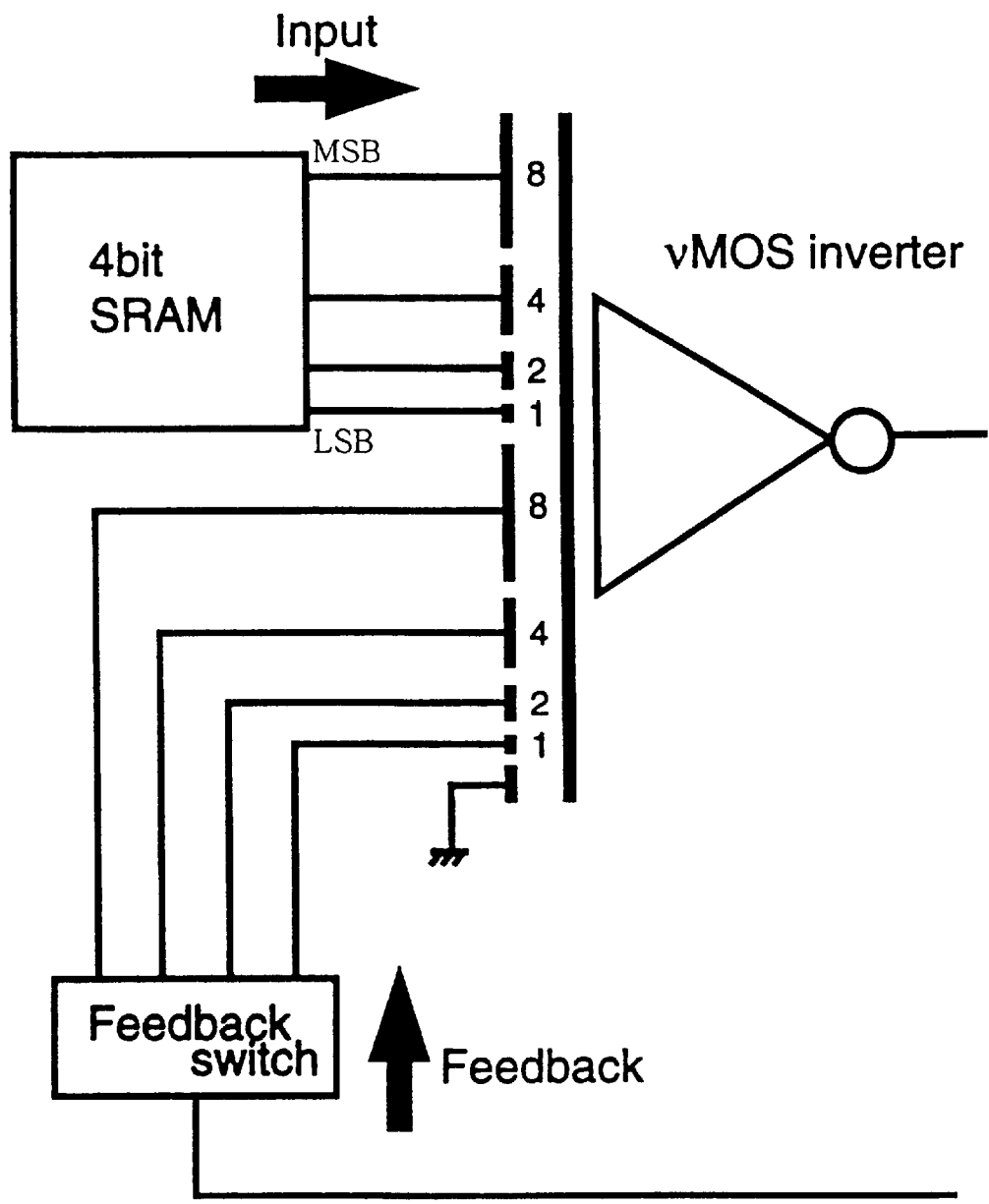
FIG. 21 is a circuit diagram showing a D/A converter.

The D/A converter portion thereof is realized by dividing the ratio of the coupling capacity to the floating gate of the neuron MOS transistor so as to be 1:2:4:8, as shown in FIG. 21, and by inputting each bit thereinto. Here, a priority having four bits was assumed; however, it is of course the case that it is possible to alter the number of divisions or the division ratio of the capacity in accordance with the number of bits of the priority.

Reference 2006 indicates a switching block which changes the feedback gain; this sets the feedback node to the feedback voltage or to the ground potential based on a signal from the feedback controller. The size of each switch may be altered in accordance with the size of the coupling capacity of the neuron MOS inverter.

The winner-take-all controller (2007) decodes commands from the exterior, and exercises control over the entirety of the winner-take-all circuit, thus causing the circuit to operate correctly.

Furthermore, this circuit sends signals to the MOS controller (2008), and generates the floating reset signal of the neuron MOS at the correct timing.

Figure 22:
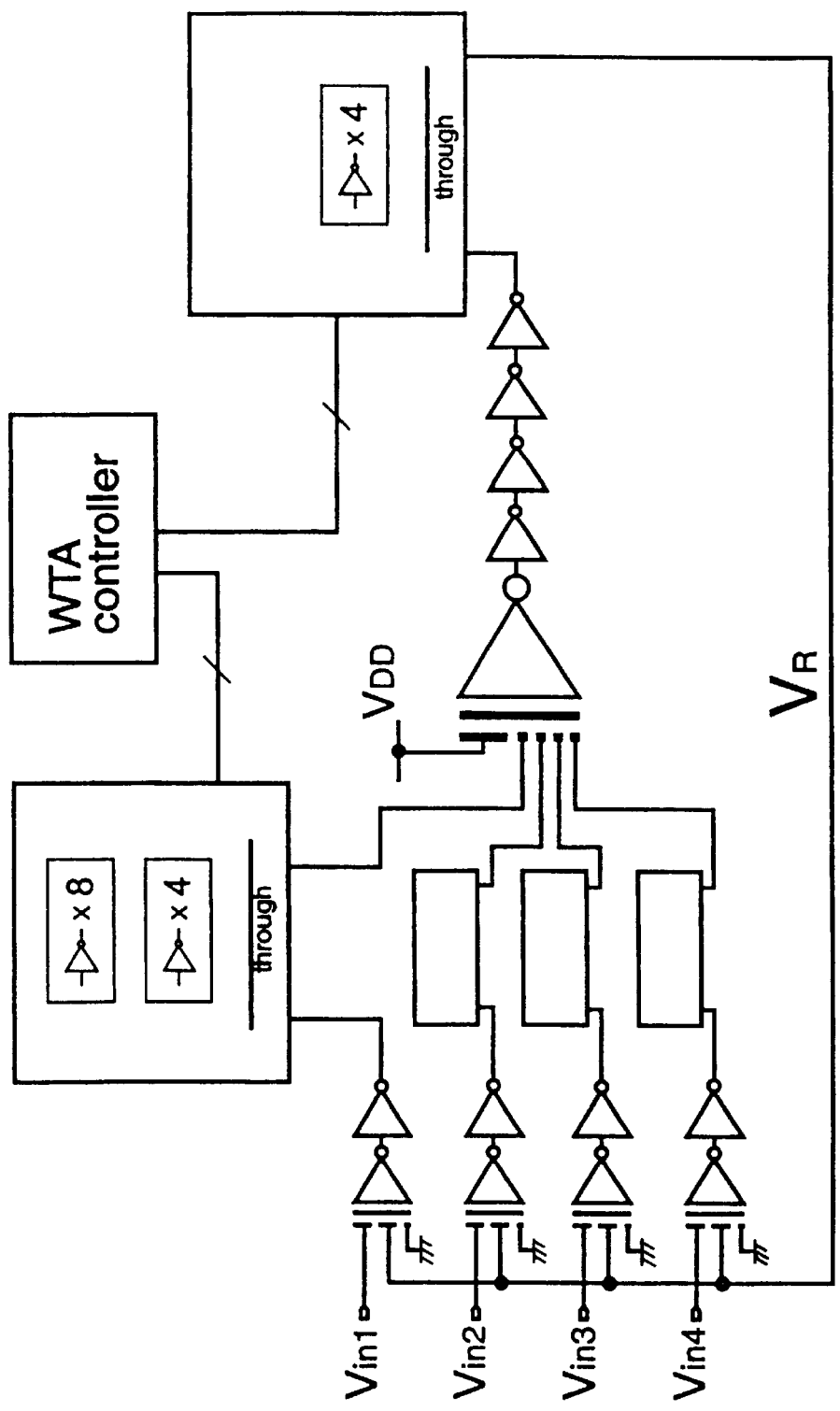
FIG. 22 is a circuit diagram showing an example of a gain controller.

Next, the gain controllers (2009, 2010, 2011, 2012, 2013) connected to the output parts of the neuron MOS inverter cells A and cell B are capable of switching the number of inverter stages, as shown in FIG. 22.

Here, the number of inverter stages changed as shown in FIG. 22 was prepared; however, it is of course the case that other numbers of stages may be employed where necessary.

Figure 23:
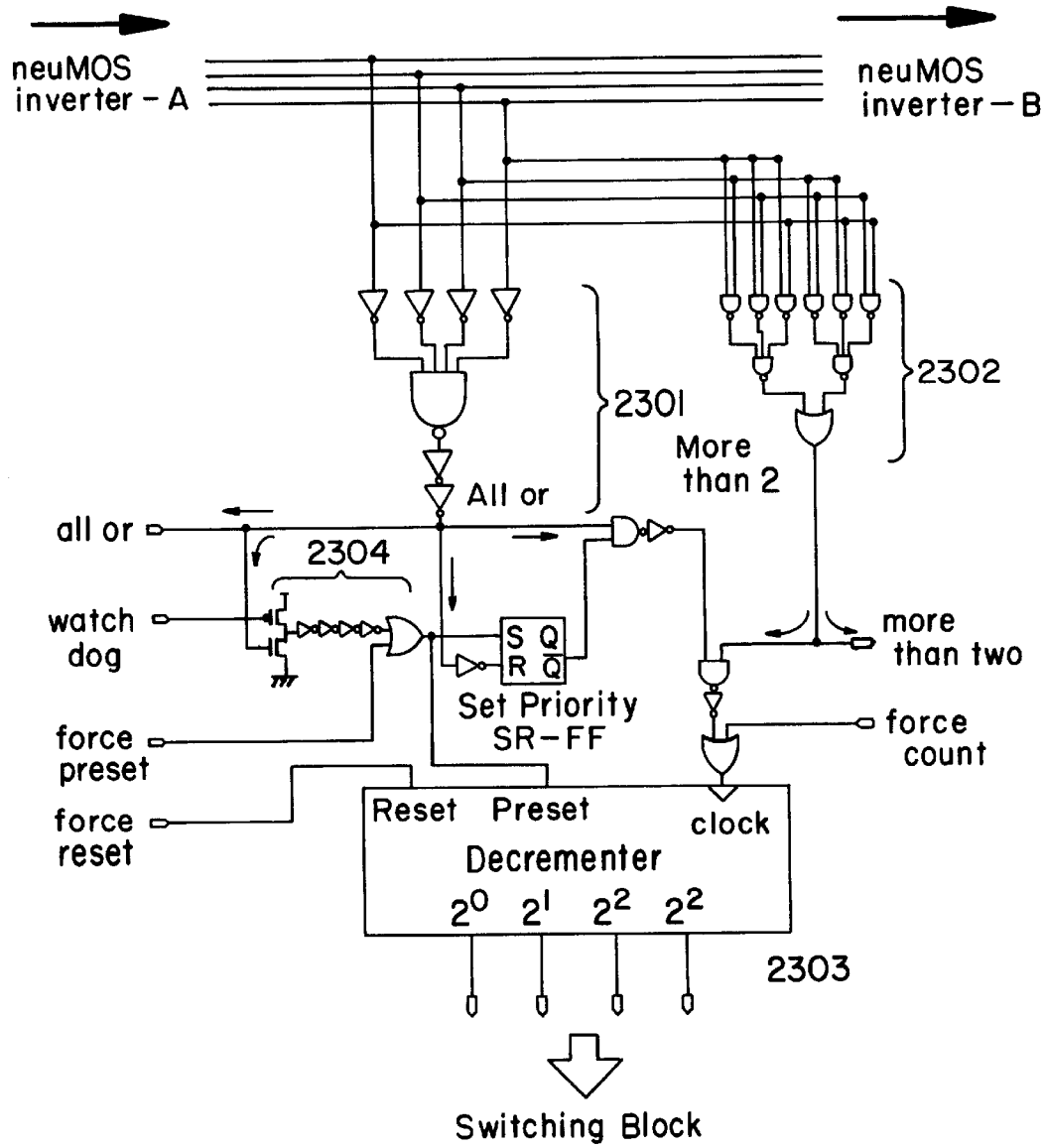
FIG. 23 is a circuit diagram showing a logical circuit which serves to alter the feedback gain.

The feedback controller (2014) is a logical circuit which serves to change the feedback gain described above. A circuit diagram of this circuit is shown in FIG. 23.

By means of ALL OR (2301), all OR outputs of the circuit are accepted, and by means of this, the oscillation of the circuit is detected.

By means of the more-than-two circuit (2302), a determination is made as to whether a winner has been determined or not.

By means of the decrimenter (2303), a signal is set to the switching block which alters the feedback gain.

When the circuit is reset, the outputs of this decrimenter (2303) are all set to a value of 1, and the switches are set so that the feedback voltage is coupled with the floating gates.

The signal from ALL OR (2301) is inputted into the clock input of the decrimenter (2303), and when the circuit oscillates, the ALL OR (2301) sends a signal to the decrimenter (2303) which serves to switch the switching block. The more-than-two circuit (2302) masks the signal from the ALL OR (2301), and the signal from the ALL OR (2301) is transmitted to the decrimenter (2303) only when two or more of the outputs of the circuit are oscillating, and the feedback gain is reduced one step at a time.

Here, the feedback gain was reduced one step at a time using the decrimenter; however, it is also possible to increase this one step at a time using an incrimenter. Furthermore, it is also possible to conceive of a logical circuit in which, when three or more are oscillating, the decrease is not one step at a time but two or more steps at a time, and when two outputs are oscillating, decrease is by one step at a time.

Furthermore, a watch dog circuit 2304 is also included which, when the output of the circuit does not oscillate for a specified period of time, makes a determination that the feedback gain has dropped too far, and resets the decrimenter.

Figure 24:
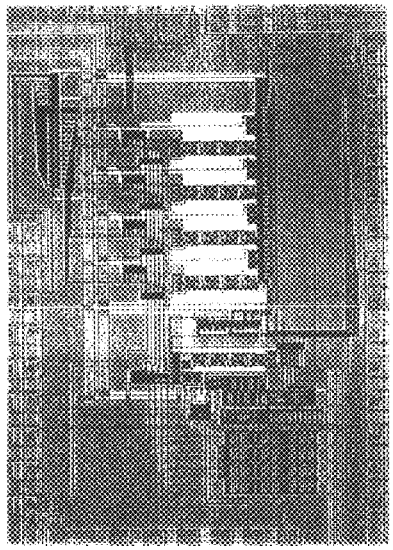
FIG. 24 is a chip image of the semiconductor integrated circuit of the winner-take-all cell.

FIG. 24 is a chip image of a winner-take-all cell which is actually realized as a semiconductor integrated circuit.

The circuit shown in the image is a four-bit four-input winner-take-all cell circuit.

This is constructed using C-MOS, and the chip surface area thereof is 1209×1810 square microns in the core portion, and the die size is 2050×2950 square microns. A two-layer poly two-layer metal process having an 0.8 micron rule was employed.

Figure 25:
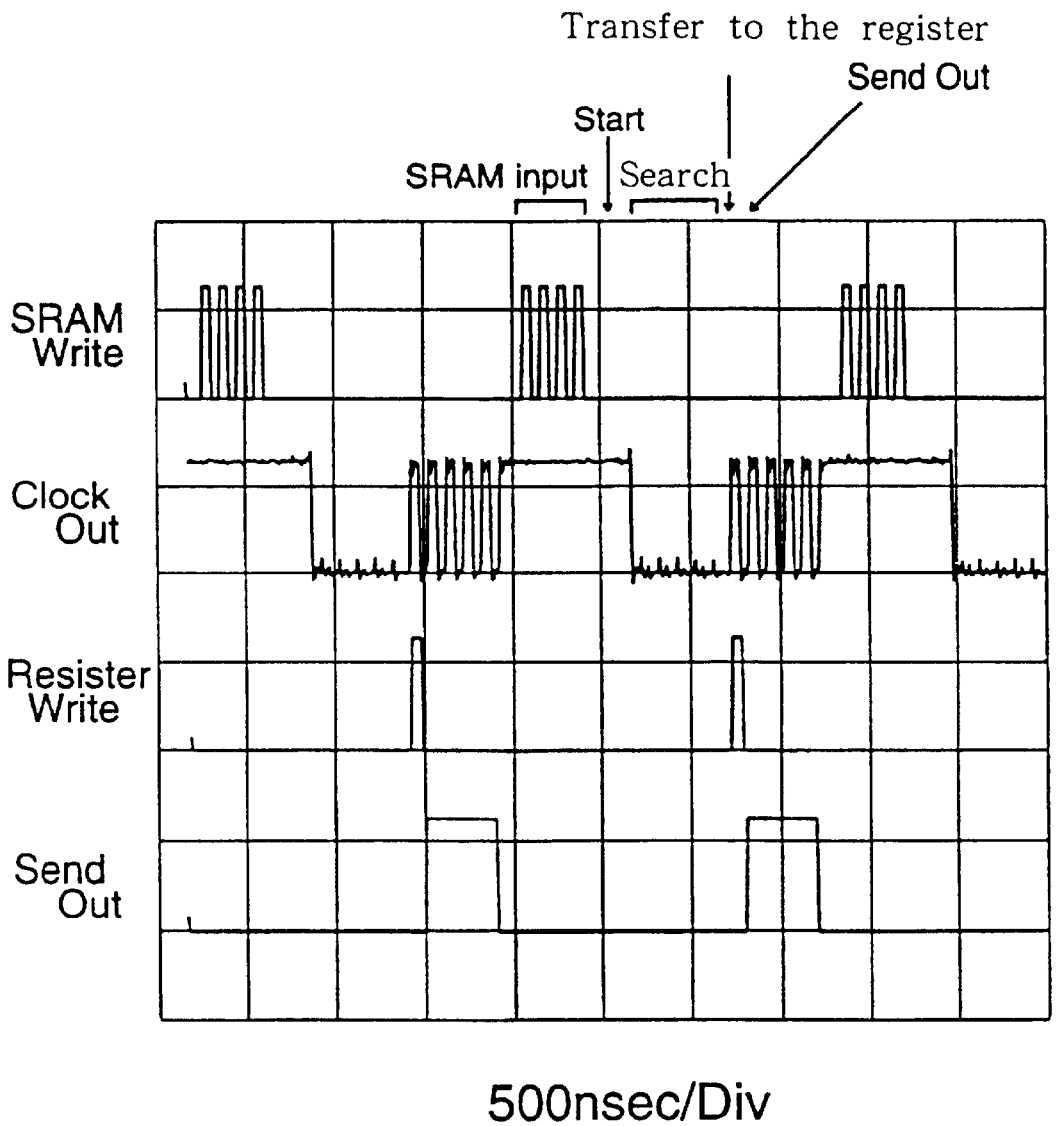
FIG. 25 is a graph showing the measured waveform of the semiconductor integrated circuit of FIG. 24.

FIG. 25 shows the measured waveforms. The period in which latching is carried out serves as the unit of cell operations.

The waveforms indicate, from the top, the write signal to the SRAM, the clock out, the transmission signal to the register storing the winner, and the send out signal transmitted to the C circuits indicating the possibility of transmission of the winner data; it can be seen that these signals are sequentially outputted.

In the circuit diagram of FIG. 18, when the various winner-take-all cells conduct data exchange, it is necessary to conduct this using the timing at the cell sending the data and the cell receiving the data. For this reason, this timing is controlled at the circuits termed the C circuits.

Figure 26:
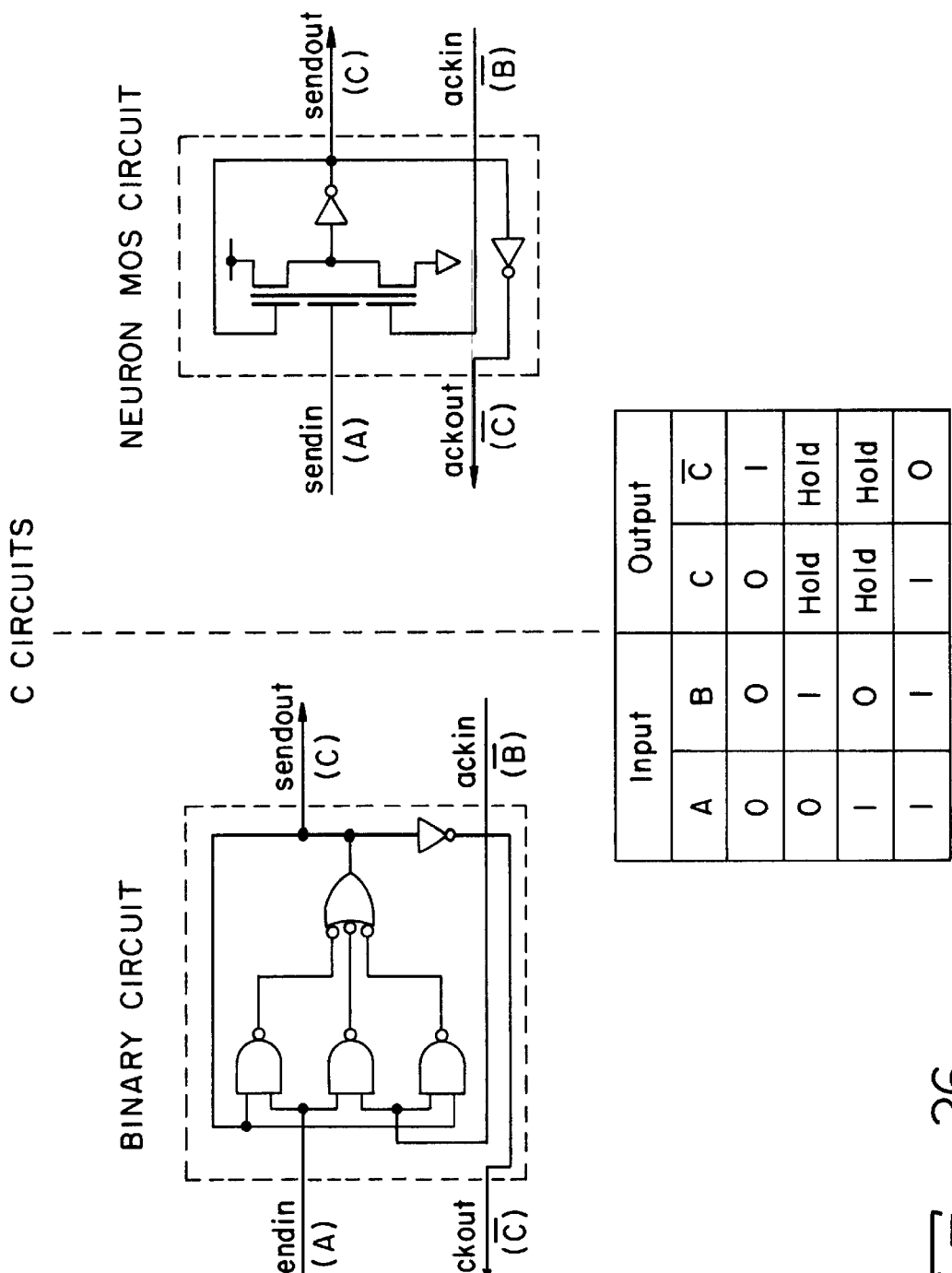
FIG. 26 is a circuit diagram showing the C circuit.

FIG. 26 shows a circuit diagram of the C circuits. As is shown in the central part of the figure, when the preparation on the sending side and the receiving side has been accomplished and the sendin and ackin signals have a value of 1 (High), then the state of the circuit is inverted, and signals are sent from sendout and ackout to both winner-take-all cells so as to conduct data exchange. The left hand circuit is a C circuit employing conventional binary logic. The structure employs four NAND gates and one inverter. The right hand circuit is a C circuit which is constructed using neuron MOS transistors. This is constructed using one neuron MOS inverter and two standard inverters, and this is advantageous in terms of surface area.

Figure 27:
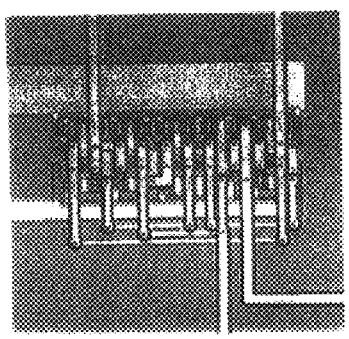
FIG. 27 is a chip image of the semiconductor integrated circuit of the C circuit.
Figure 27:
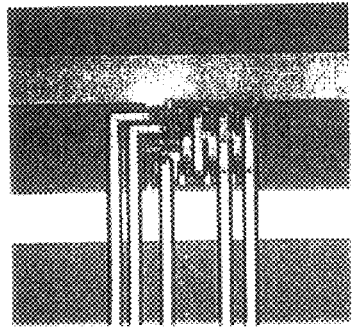

FIG. 27 shows chip images of these C circuits actually realized as semiconductor integrated circuits.

The left hand image shows the circuit constructed using only binary logic. The right hand image shows the circuit constructed using neuron MOS. A two-layer poly two-layer metal process having a 0.8 microns rule was employed.

Figure 28:
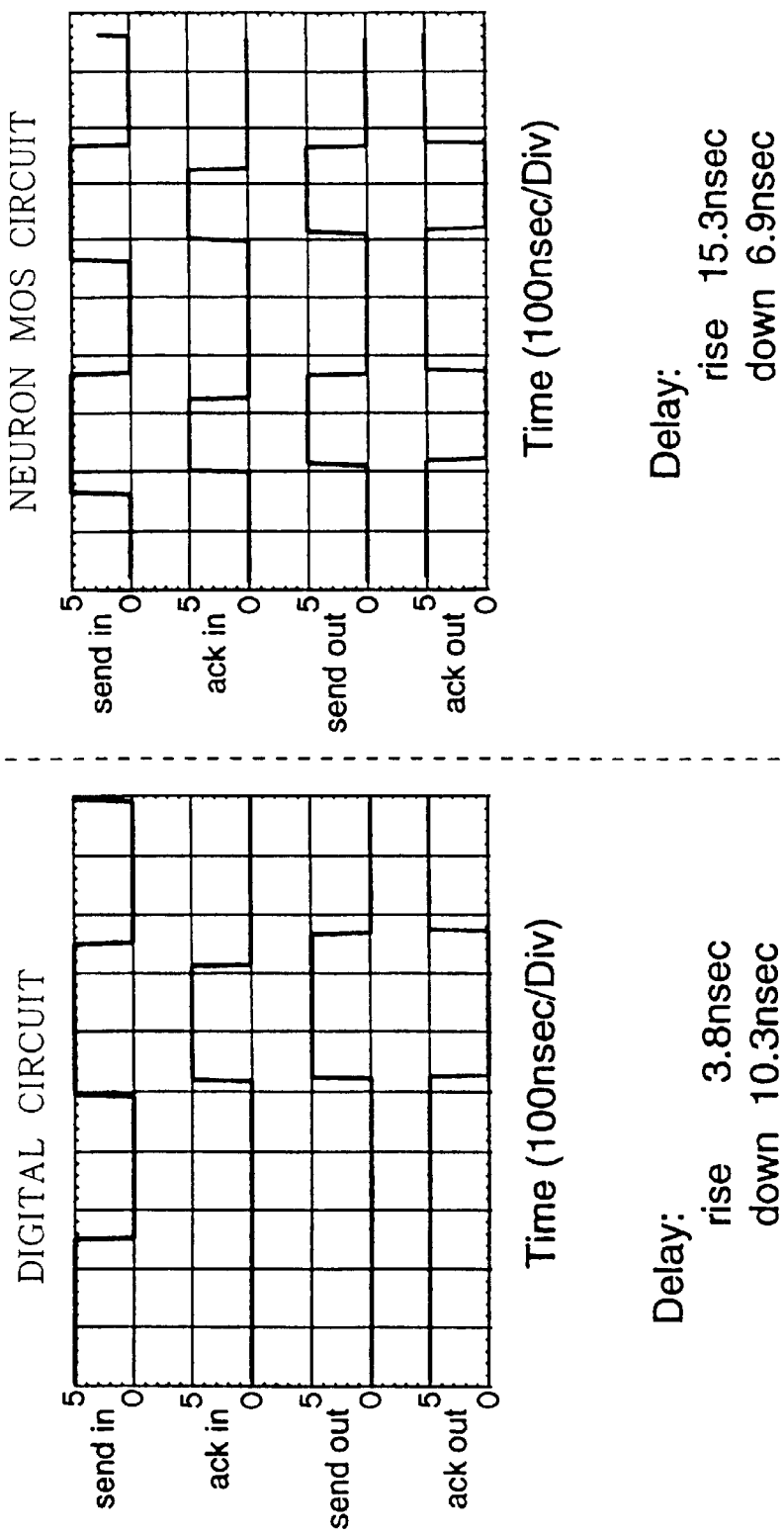
FIG. 28 is a graph showing the measured waveform of the semiconductor integrated circuit of FIG. 27.

FIG. 28 shows the measured waveforms of the C circuits. The left hand side shows the waveform of the circuit constructed using only binary logic. The right hand side shows the waveform of the circuit constructed using neuron MOS.

It can be seen that the same waveform is obtained by circuits using either binary logic or neuron MOS.

Next, the operation of the priority queue circuit of FIG. 18 of the present invention will be explained.

First, inputted data and the priorities appended to these data are inputted into the various winner-take-all cells (1801, 1802). When this is done, the winner-take-all cells (1801, 1802) select the data among the inputted data having the highest priority (the winner data) in a self-synchronized manner. At the same time, one data other than the data having the highest priority (loser data) is also selected. When the winner and loser data are selected, a signal indicating the preparations for sending and receiving have been completed is sent to the C circuits (1804, 1803). In this case, it is assumed that the winner data are sent in the rightward direction, while the loser data are sent in the leftward direction.

In order to simplify the explanation, only the winner data will be examined. The winner data are selected, and a signal indicating that preparations for sending of the data have been completed is outputted to the C circuit which serves to send the data in a rightward direction. When the sending and receiving preparations in both the left-hand and right-hand winner-take-all cells have been completed, the C circuit sends a signal for winner data exchange to the right-hand cell, and based on this signal, the right-hand cell writes the winner data in the portion of the SRAM which held the loser data. At this time, the loser data are also exchanged by the left and right hand cells; however, the writing in the SRAM occurs in the position in the left hand cell where the winner data were stored.

In this manner, the winner-take-all cells conduct data exchange in a non-synchronized manner, and ultimately, the winner data are sent from the right-hand end in this case.

In the present invention, the winner-take-all cells were connected in a straight line, and the winner of all the data was selected, however, it is of course the case that the winner-take-all cells may be connected in a tree shape, and the winner data may be selected in this way.

What is claimed is:

1. A semiconductor arithmetic circuit to specify the maximum voltage signal among a plurality of input signals comprising:

a plurality of inverter circuits constructed using a neuron MOS transistor, said neuron MOS transistor having a semiconductor region of one conductivity type on a substrate, said region provided with source and drain regions of an opposite conductivity type, a floating gate electrode which is provided at a region separating said source and drain regions via an insulting film and which is in an electrically floating state, and a plurality of input gates capacitively coupled with said floating gate electrode via an insulating film;

a first logical arithmetic circuit having input and output terminals;

a second logical arithmetic circuit having input and output terminals for input and output signals respectively; and a third logical arithmetic circuit having input and output terminals for input and output signals respectively, the performance of said third logical arithmetic circuit being controlled by the output signal of said second logical arithmetic circuit; wherein said plurality of input signals are inputted to respective first input gate of said plurality of inverter circuits, output signals of said plurality of inverter circuits are inputted to said input terminals of said first and second logical arithmetic circuits, an output signal of said first arithmetic logical circuit is inputted into said input terminal of said third arithmetic logical circuit, and said output signal of said third arithmetic logical circuit is fed back to second input gates of said plurality of inverter circuits.

2. The semiconductor arithmetic circuit in accordance with claim 1, wherein said first logical arithmetic circuit has an output terminal and has the function of outputting a predetermined logical signal to said output terminal when the number of values of '1' or '0' in a plurality of binary signal inputs is in excess of a predetermined number.

3. The semiconductor arithmetic circuit in accordance with claim 2, wherein said first logical arithmetic circuit contains an inverter circuit constructed using one or more neuron MOS transistors.

4. The semiconductor arithmetic circuit in accordance with claim 2, wherein said first logical arithmetic circuit creates an output signal having a value of '0' when the number of values of '1' within a plurality of binary signal inputs is 1 or more.

5. The semiconductor arithmetic circuit in accordance with claim 1, where in said floating gate electrode of said neuron MOS transistors is connected to one of the source and drain of a MOS transistor, and by means of placing said MOS transistor in an OFF state, said floating gate electrode is placed in an electrically floating state.

6. The semiconductor arithmetic circuit in accordance with claim 1, where in said second logical arithmetic circuit changes the output signal thereof in accordance with predetermined rules when the number of values of '1' or '0' in a plurality of binary inputs is in excess of a predetermined number.

7. The semiconductor arithmetic circuit in accordance with claim 6, wherein said second logical arithmetic circuit has the function of specifying the number of values '1' in a plurality of binary signal inputs, and alters its said output signal in accordance with predetermined rules in response to the number of values '1'.

8. The semiconductor arithmetic circuit in accordance with claim 1, wherein said third logical arithmetic circuit attenuates and amplifies its input signal by a predetermined proportion in accordance with at least one control signal.

9. The semiconductor arithmetic circuit in accordance with claim 8, wherein said third logical arithmetic circuit has as its output signal one of a predetermined signal voltage or its input signal.

10. The semiconductor arithmetic circuit in accordance with claim 9, wherein said third logical arithmetic circuit has two or more output signals, and said output signal of said third logical arithmetic circuit are inputted into the same number of said second input gates.

11. A data processing device comprising:

a plurality of semiconductor arithmetic circuits each having a plurality of inverter circuits constructed using a neuron MOS transistor, said neuron MOS transistor having a semiconductor region of one conductivity type on a substrate, said region provided with source and drain regions of an opposite conductivity type, a floating gate electrode which is provided at a region separating said source and drain regions via an insulting film and which is in an electrically floating state, and a plurality of input gates capacitively coupled with said floating gate electrode via an insulating film;

a first logical arithmetic circuit having input and output terminals;

a second logical arithmetic circuit having input and output terminals for input and output signals respectively; and a third logical arithmetic circuit having input and output terminals for input and output signals respectively, the performance of said third logical arithmetic circuit being controlled by the output signal of said second logical arithmetic circuit; wherein said plurality of input signals are inputted to respective first input gate of said plurality of inverter circuits, output signals of said plurality of inverter circuits are inputted to said input terminals of said first and second logical arithmetic circuits, an output signal of said first arithmetic logical circuit is inputted into said input terminal of said third arithmetic logical circuit, and said output signal of said third arithmetic logical circuit is fed back to second input gates of said plurality of inverter circuits; and said semiconductor arithmetic circuits connected in a plurality of stages, which are provided with a means for incorporating and storing a plurality of numerical values from the exterior of the device, said plurality of numerical values are inputted into said semiconductor arithmetic circuits and an output signal of said semiconductor arithmetic circuits is inputted into a fourth logical arithmetic circuit, and by means of the output signal of said fourth logical arithmetic circuit, at least one numerical value is selected from said plurality of numerical values, and outputted.

12. The data processing device in accordance with claim 11, wherein each semiconductor arithmetic circuit connected in a plurality of stages independently selects and executes optimal processing in accordance with said plurality of numerical values applied.

13. The data processing device in accordance with claim 11, is provided with a fifth logical arithmetic circuit which receives predetermined signals from both a sending side semiconductor circuit and a receiving side semiconductor circuit for the selected numerical values, and outputs a predetermined signal to both when these signals meet predetermined conditions.

14. The data processing device in accordance with claim 13, wherein said fifth logical circuit contains an inverter circuit comprising one or more neuron MOS transistors.

* * * * *